United States Patent
Chen et al.

(10) Patent No.: US 8,839,270 B2
(45) Date of Patent: Sep. 16, 2014

(54) SYNCHRONIZATION OF COMMUNICATION CONNECTION STATE WITH COMMUNICATION USER INTERFACE

(75) Inventors: Mingtse Chen, Fremont, CA (US); Anil K. Annadata, Milpitas, CA (US); Kuang Huang, Fremont, CA (US)

(73) Assignee: Siebel Systems, Inc., San Mateo, CA (US)

( * ) Notice: Subject to any disclaimer, the term of this patent is extended or adjusted under 35 U.S.C. 154(b) by 865 days.

(21) Appl. No.: 10/457,905

(22) Filed: Jun. 10, 2003

(65) Prior Publication Data
US 2007/0204272 A1 Aug. 30, 2007

Related U.S. Application Data

(63) Continuation of application No. 09/823,531, filed on Mar. 31, 2001, now Pat. No. 8,601,492.

(51) Int. Cl.
G06F 3/00 (2006.01)
G06F 9/44 (2006.01)
G06F 13/00 (2006.01)

(52) U.S. Cl.
USPC ...... 719/318; 719/321; 719/328; 379/265.09; 379/265.02; 379/265.01

(58) Field of Classification Search
USPC .................... 719/318; 709/205; 715/733, 735
See application file for complete search history.

(56) References Cited

U.S. PATENT DOCUMENTS

| | | | |
|---|---|---|---|
| 5,309,563 A | 5/1994 | Farrand et al. ............... | 709/216 |
| 5,473,680 A | 12/1995 | Porter ..................... | 379/221.15 |
| 5,506,898 A | 4/1996 | Costantini et al. ............ | 379/266 |
| 5,524,147 A | 6/1996 | Bean .............................. | 379/265 |
| 5,555,365 A | 9/1996 | Selby et al. ................... | 395/159 |
| 5,594,791 A | 1/1997 | Szlam et al. .................. | 379/265 |

(Continued)

FOREIGN PATENT DOCUMENTS

| | | | | |
|---|---|---|---|---|
| EP | 1113656 A2 | 7/2001 | ...................... | 3/523 |
| WO | WO 97/16014 | 5/1997 | | |
| WO | WO 97/42728 | 11/1997 | | |
| WO | WO 00/49778 | 8/2000 | | |

OTHER PUBLICATIONS

R. Fielding et al.; Hypertext Transfer Protocol—HTTP/1.1; Jun. 1999; excerpted 4 pages.*

(Continued)

*Primary Examiner* — H S Sough
*Assistant Examiner* — Kimberly Jordan
(74) *Attorney, Agent, or Firm* — Campbell Stephenson LLP

(57) ABSTRACT

A method, system, computer system and computer program product determine that a communication connection has switched between an active state and an inactive state and cause a user interface for communicating via the connection to be updated asynchronously to correspond to the current state. For example, the user interface can indicate that the connection is active or inactive and allow or disallow initiation of communication via the connection accordingly. For example, consider a call center agent using a computer system as the user interface to the telephone channel, but the user does not click a "hang up" button when the caller hangs up the telephone. The disconnection of the telephone is determined and the user interface is asynchronously updated, thereby allowing the agent to make another call. In one embodiment, a communication server determines the change in state and causes a web browser user interface to be updated asynchronously.

38 Claims, 31 Drawing Sheets

(56) References Cited

U.S. PATENT DOCUMENTS

| | | | |
|---|---|---|---|
| 5,699,361 A | 12/1997 | Ding et al. | 370/431 |
| 5,734,852 A | 3/1998 | Zias et al. | 395/334 |
| 5,754,830 A | 5/1998 | Butts et al. | 395/500 |
| 5,805,886 A | 9/1998 | Skarbo et al. | 395/685 |
| 5,828,882 A | 10/1998 | Hinckley | 395/680 |
| 5,852,732 A | 12/1998 | Freund et al. | 718/101 |
| 5,884,032 A | 3/1999 | Bateman et al. | 395/200.34 |
| 5,894,512 A | 4/1999 | Zenner | 379/265 |
| 5,905,879 A | 5/1999 | Lambrecht | 395/297 |
| 5,915,011 A | 6/1999 | Miloslavsky | 379/219 |
| 5,928,325 A | 7/1999 | Shaughnessy et al. | 709/206 |
| 5,946,399 A | 8/1999 | Kitaj et al. | 380/49 |
| 5,961,620 A | 10/1999 | Trent et al. | 710/105 |
| 5,964,836 A | 10/1999 | Rowe et al. | 709/221 |
| 5,974,474 A | 10/1999 | Furner et al. | 710/8 |
| 5,983,019 A | 11/1999 | Davidson | 395/705 |
| 6,058,435 A | 5/2000 | Sassin et al. | 709/305 |
| 6,064,730 A | 5/2000 | Ginsberg | 379/265 |
| 6,092,102 A | 7/2000 | Wagner | 709/206 |
| 6,108,695 A | 8/2000 | Chawla | 709/217 |
| 6,118,899 A | 9/2000 | Bloomfield et al. | 382/233 |
| 6,134,318 A | 10/2000 | O'Neil | 379/266 |
| 6,138,158 A | 10/2000 | Boyle et al. | 709/225 |
| 6,154,209 A | 11/2000 | Naughton et al. | 345/339 |
| 6,175,564 B1 * | 1/2001 | Miloslavsky et al. | 370/352 |
| 6,185,288 B1 | 2/2001 | Wong | 379/219 |
| 6,199,104 B1 | 3/2001 | Delph | 709/208 |
| 6,212,511 B1 | 4/2001 | Fisher | 1/1 |
| 6,243,452 B1 * | 6/2001 | O'Shaughnessey et al. | 379/201.01 |
| 6,263,066 B1 | 7/2001 | Shtivelman et al. | 379/266 |
| 6,272,216 B1 | 8/2001 | Vaios | 379/265.01 |
| 6,300,947 B1 | 10/2001 | Kanevsky | 345/333 |
| 6,314,178 B1 | 11/2001 | Walker et al. | 379/266.01 |
| 6,314,451 B1 | 11/2001 | Landsman et al. | 709/203 |
| 6,332,154 B2 * | 12/2001 | Beck et al. | 709/204 |
| 6,337,858 B1 | 1/2002 | Petty et al. | 370/356 |
| 6,360,368 B1 | 3/2002 | Chawla | 725/94 |
| 6,389,132 B1 | 5/2002 | Price | 379/265.01 |
| 6,449,260 B1 | 9/2002 | Sassin et al. | 370/270 |
| 6,449,646 B1 | 9/2002 | Sikora et al. | 709/226 |
| 6,463,292 B1 | 10/2002 | Rahman | 455/466 |
| 6,480,600 B1 | 11/2002 | Neyman et al. | 379/265.09 |
| 6,493,446 B1 | 12/2002 | Cherry | 379/265.05 |
| 6,493,695 B1 | 12/2002 | Pickering et al. | 706/47 |
| 6,493,760 B1 | 12/2002 | Pendlebury et al. | 709/229 |
| 6,505,166 B1 | 1/2003 | Stephanou | 705/8 |
| 6,507,868 B2 | 1/2003 | Simmon et al. | 709/219 |
| 6,587,556 B1 * | 7/2003 | Judkins et al. | 379/219 |
| 6,594,675 B1 | 7/2003 | Schneider | 707/200 |
| 6,625,274 B1 | 9/2003 | Hoffpauir et al. | 379/229 |
| 6,681,010 B1 | 1/2004 | Anderson et al. | 379/265.11 |
| 6,690,788 B1 | 2/2004 | Bauer et al. | 379/242 |
| 6,694,352 B1 | 2/2004 | Omoigui | 709/205 |
| 6,704,409 B1 | 3/2004 | Dilip et al. | 379/265.02 |
| 6,718,366 B2 * | 4/2004 | Beck et al. | 709/204 |
| 6,718,370 B1 | 4/2004 | Coffman et al. | 709/212 |
| 6,718,393 B1 | 4/2004 | Aditya | 709/239 |
| 6,731,609 B1 * | 5/2004 | Hirni et al. | 370/260 |
| 6,744,878 B1 | 6/2004 | Komissarchik et al. | 379/265.03 |
| 6,747,970 B1 * | 6/2004 | Lamb et al. | 370/352 |
| 6,763,369 B1 | 7/2004 | Ytuarte et al. | 709/201 |
| 6,763,384 B1 | 7/2004 | Gupta et al. | 709/224 |
| 6,771,760 B1 | 8/2004 | Vortman et al. | 379/209.01 |
| 6,771,765 B1 | 8/2004 | Crowther et al. | 379/265.09 |
| 6,772,216 B1 | 8/2004 | Ankireddipally et al. | 709/230 |
| 6,778,661 B1 | 8/2004 | Yumoto et al. | 379/265.09 |
| 6,816,500 B1 | 11/2004 | Mannette et al. | 370/431 |
| 6,816,880 B1 * | 11/2004 | Stent et al. | 709/202 |
| 6,823,384 B1 | 11/2004 | Wilson et al. | 709/225 |
| 6,832,203 B1 | 12/2004 | Villena et al. | 705/8 |
| 6,879,586 B2 * | 4/2005 | Miloslavsky et al. | 370/356 |
| 6,944,272 B1 | 9/2005 | Thomas | 379/88.13 |
| 6,963,783 B1 | 11/2005 | Bi et al. | 700/94 |
| 6,978,311 B1 | 12/2005 | Netzer et al. | 709/232 |
| 7,047,534 B2 | 5/2006 | Sadovsky et al. | 719/322 |
| 7,051,066 B1 | 5/2006 | Albert et al. | 709/202 |
| 7,089,497 B2 | 8/2006 | Abbott et al. | 715/740 |
| 7,089,558 B2 | 8/2006 | Baskey et al. | 718/104 |
| 7,092,509 B1 * | 8/2006 | Mears et al. | 379/266.01 |
| 7,093,199 B2 | 8/2006 | Cragun et al. | 715/763 |
| 7,120,675 B1 | 10/2006 | Shupak et al. | 709/217 |
| 7,171,473 B1 | 1/2007 | Eftis et al. | 709/227 |
| 7,263,547 B2 | 8/2007 | Kloba et al. | 709/217 |
| 7,325,030 B2 | 1/2008 | Wright et al. | 709/203 |
| 7,353,182 B1 | 4/2008 | Missinhoun et al. | 705/8 |
| 7,392,540 B1 | 6/2008 | Pell | 726/12 |
| 2001/0039596 A1 | 11/2001 | Collin et al. | 719/321 |
| 2001/0042131 A1 | 11/2001 | Mathon et al. | 709/238 |
| 2001/0054064 A1 | 12/2001 | Kannan | 709/203 |
| 2002/0026335 A1 | 2/2002 | Honda | 705/4 |
| 2002/0032809 A1 | 3/2002 | Bateman et al. | 710/5 |
| 2002/0042845 A1 | 4/2002 | Burmann et al. | 709/249 |
| 2002/0052954 A1 | 5/2002 | Polizzi et al. | 709/215 |
| 2002/0055967 A1 * | 5/2002 | Coussement | 709/202 |
| 2002/0072921 A1 | 6/2002 | Boland et al. | 705/1 |
| 2002/0087385 A1 | 7/2002 | Vincent | 705/10 |
| 2002/0144233 A1 | 10/2002 | Chong et al. | 717/105 |
| 2002/0191029 A1 | 12/2002 | Gillespie et al. | 715/810 |
| 2003/0009520 A1 | 1/2003 | Nourbakhsh et al. | 709/204 |
| 2003/0014598 A1 | 1/2003 | Brown | 711/141 |
| 2003/0018702 A1 | 1/2003 | Broughton et al. | 709/202 |
| 2003/0023734 A1 | 1/2003 | Martin et al. | 709/229 |
| 2003/0093533 A1 | 5/2003 | Ezerzer et al. | 709/227 |
| 2004/0031030 A1 | 2/2004 | Kidder et al. | 717/172 |
| 2005/0003812 A1 | 1/2005 | Gladwin et al. | 455/426.1 |
| 2005/0010526 A1 | 1/2005 | Takahashi et al. | 705/44 |

OTHER PUBLICATIONS

International Search Report as mailed from the PCT on Feb. 28, 2003 for co-related WO Application (PCT/US02/31152; Filed Sep. 30, 2002), 5 pages.

International Search Report as mailed from the PCT on Jul. 12, 2002, for International Application No. PCT/US02/09879, 4 pages.

International Search Report as mailed from the PCT on Sep. 4, 2002, for International Application No. PCT/US02/10191, 4 pages.

Schmidt, et al., Experiences with an Object-Oriented Architecture for Developing Dynamically Extensible Distributed System Management Software, Nov. 28-Dec. 2, 1994, pp. 500-506.

GW Micro, Inc. "Window-Eyes 4.0 User's Guide," Mar. 3, 2001, pp. 1-286, Available at web.archive.org/web/20010303133328/http://www.gwmicro.com/wemanual/.

* cited by examiner

FIG. 2a: CNCTR, Communication Channel Driver Table

| Column Name | Type | Length | Comments |
|---|---|---|---|
| CNCTR_ID | Varchar | 15 | Identifier for channel driver channel driver CNCTR. CNCTR refers to software *connector*. |
| NAME | Varchar | 75 | Name of channel driver. |
| MEDIA_TYPE | Varchar | 50 | Media type. The value of this column can be expanded by customer. |
| LIB_NAME | Varchar | 250 | File name of channel driver DLL |
| INBOUND_FLG | Char | 1 | To indicate whether this channel driver supports inbound communications |
| OUTBOUND_FLG | Char | 1 | To indicate whether this channel driver supports outbound communications |
| CNCTR_MEDIA_STR | Varchar | 100 | The media string defined by the driver vendor, which will be used at run time to invoke the media service for the channel driver. |
| DESC_TEXT | Varchar | 250 | Comments |
| UQ_DRIVER_FLAG | Char | 1 | To indicate whether this channel driver is Universal Queuing type of channel driver |

FIG. 2b: CNCTR_PARM, Channel Driver Parameter Table

| Column Name | Type | Length | Comments |
|---|---|---|---|
| CNCTR_PARM_ID | Varchar | 15 | Identifier for channel driver parameter |
| NAME | Varchar | 75 | Name of channel driver parameter |
| DFLT_VALUE | Varchar | 250 | Default value of channel driver parameter |
| CNCTR_ID | Varchar | 15 | |
| REQUIRED_FLG | Char | 1 | To indicate whether this parameter must have a value at runtime |

FIG. 2c: PROF, Communication Channel Driver Profile Table

| Column Name | Type | Length | Comments |
|---|---|---|---|
| PROF_ID | Varchar | 15 | Identifier for channel driver profile |
| NAME | Varchar | 75 | Name of channel driver profile |
| CNCTR_ID | Varchar | 15 | |

FIG. 2d: PROF_PARM, Communication Channel Driver Profile Parameter Table

| Column Name | Type | Length | Comments |
|---|---|---|---|
| PROF_PARM_ID | Varchar | 15 | Identifier for channel driver profile parameter |
| PROF_ID | Varchar | 15 | Channel Driver Profile ID |
| CNCTR_PARM_ID | Varchar | 15 | Parameter name ID |
| VALUE | Varchar | 250 | Override value of channel driver profile parameter. |

FIG. 2e: AGENT_PREF, Agent Preference Table

| Column Name | Type | Length | Comments |
|---|---|---|---|
| AGENT_PREF_ID | Varchar | 15 | Identifier for agent preference |
| EMP_ID | Varchar | 15 | |
| SETTING_NAME | Varchar | 75 | Preference name |
| SETTING_VALUE | Varchar | 250 | Preference value |
| SETTING_TYPE | Varchar | 50 | Preference type, e.g., "CTI" or "Communication" |

FIG. 2f: AGENT_STAT, Agent Status Table.

| Column Name | Type | Length | Comments |
|---|---|---|---|
| AGENT_STAT_ID | Varchar | 15 | Identifier for agent status |
| EMP_ID | Varchar | 15 | Employee ID |
| PROF_ID | Varchar | 15 | The channel driver profile ID. Agent has different status for different types of channel driver profiles. |
| NOT_READY_FLG | Char | 1 | Is agent not ready? |
| BUSY_FLG | Char | 1 | Is agent busy? |

FIG. 2g: MEDIA_STAT, Communication Media Status Table.

| Column Name | Type | Length | Comments |
|---|---|---|---|
| MEDIA_STAT_ID | Varchar | 15 | Identifier for media status |
| EMP_ID | Varchar | 15 | Employee ID |
| PROF_ID | Varchar | 15 | The channel driver profile ID of the channel driver profile to which the status corresponds. |
| MEDIA_OBJECT_STR | Varchar | 250 | The string to represent the media object (e.g. the agent's extension number, or the sender's address of an email) |
| WORKING_SINCE_DT | Date Time | 7 | Work item starting time |
| WORK_ITEM_STR | Varchar | 250 | Work item ID |

FIG. 2h: TELESET, Teleset Table.

| Column Name | Type | Length | Comments |
|---|---|---|---|
| TELESET_ID | Varchar | 15 | Identifier for teleset |
| NAME | Varchar | 30 | Teleset Name |
| HOSTNAME | Varchar | 70 | Hostname of the computer connected to the Teleset. |
| COMMENTS | Varchar | 250 | |

FIG. 2i: EXTENSION, Extension Table.

| Column Name | Type | Length | Comments |
|---|---|---|---|
| EXTENSION_ID | Varchar | 15 | Identifier for extension |
| TELESET_ID | Varchar | 15 | Teleset ID |
| DN_EXT | Varchar | 15 | Extension Information |
| EXT_ACD_QUE | Varchar | 30 | This is the ACD queue to which this extension belongs. |
| EXT_TYPE | Varchar | 30 | ACD Extension or standard extension |
| AUTO_LOGIN_FLAG | Char | 1 | Indicate if we need to login to ACD for this extension at startup. |

FIG. 2j: AGENT, Communication Agent Table.

| Column Name | Type | Length | Comments |
|---|---|---|---|
| AGENT_ID | Varchar | 15 | Identifier for agent |
| PR_CFG_ID | Varchar | 15 | The primary configuration the agent uses. |
| EMP_ID | Varchar | 15 | Employee ID |
| ACTIVE_CFG_ID | Varchar | 15 | The currently active configuration. |
| ACTIVE_TELESET_ID | Varchar | 15 | The Teleset that the agent is currently using. |

FIG. 2k: AGENT_TELSET, Communication Agent-Teleset Table

| Column Name | Type | Length | Comments |
|---|---|---|---|
| AGENT_TELSET_ID | Varchar | 15 | Identifier for agent/teleset relationship |
| AGENT_ID | Varchar | 15 | Agent ID |
| TELESET_ID | Varchar | 15 | Teleset ID |

FIG. 2l: AGENT_QUE, Agent-Queue Table.

| Column Name | Type | Length | Comments |
|---|---|---|---|
| AGENT_QUE_ID | Varchar | 15 | Identifier for agent/queue relationship |
| AGENT_ID | Varchar | 15 | Agent ID |
| ACD_QUEUE_NAME | Varchar | 30 | ACD Queue |
| AUTO_LOGIN_FLAG | Char | 1 | Indicates need to login to ACD for this extension at startup. |

FIG. 2m: AGENT_LIM, Communication Agent Limitation Table.

| Column Name | Type | Length | Comments |
|---|---|---|---|
| AGENT_LIM_ID | Varchar | 15 | Identifier for agent limitation |
| AGENT_ID | Varchar | 15 | Agent ID |
| PROF_ID | Varchar | 15 | Channel Driver Profile ID that agent cannot use. |

FIG. 2n: CFG, Communication Configuration Table.

| Column Name | Type | Length | Comments |
|---|---|---|---|
| CFG_ID | Varchar | 15 | Identifier for configuration |
| NAME | Varchar | 30 | Configuration name |
| INGRP_FLAG | Char | 1 | To indicate whether this configuration is for inbound response group used in inbound communication receiver. |
| COMMENTS | Varchar | 250 | |

FIG. 2o: CFG_PROF, Communication Configuration Channel Driver Profile Table

| Column Name | Type | Length | Comments |
|---|---|---|---|
| CFG_PROF_ID | Varchar | 15 | Configuration/channel driver profile relationship |
| CFG_ID | Varchar | 15 | Configuration ID |
| PROF_ID | Varchar | 15 | Channel Driver Profile ID |

FIG. 2p: AGENT_CFG, Communication Agent - Configuration Table

| Column Name | Type | Length | Comments |
|---|---|---|---|
| AGENT_CFG_ID | Varchar | 15 | Identifier for agent/configuration relationship |
| AGENT_ID | Varchar | 15 | Agent ID |
| CFG_ID | Varchar | 15 | Configuration ID |

FIG. 2q: CFG_PARM, Communication Configuration Parameter Table.

| Column Name | Type | Length | Comments |
|---|---|---|---|
| CFG_PARM_ID | Varchar | 15 | Identifier for configuration parameter and |
| CFG_ID | Varchar | 15 | Configuration ID |
| NAME | Varchar | 50 | Parameter Name |
| VALUE | Varchar | 50 | Parameter Value |
| ACTIVE_FLG | Char | 1 | Active flag is set if the value is valid |

FIG. 2r: CMD, Communication Command Table

| Column Name | Type | Length | Comments |
|---|---|---|---|
| CMD_ID | Varchar | 15 | Identifier for command |
| CFG_ID | Varchar | 15 | Configuration ID |
| NAME | Varchar | 70 | Command name |
| TYPE | Varchar | 50 | Command type |
| PROF_ID | Varchar | 15 | The channel driver profile ID for the channel driver profile that this command is targeting. |

FIG. 2s: CMD_PARM, Communication Command Parameter Table

| Column Name | Type | Length | Comments |
|---|---|---|---|
| CMD_PARM_ID | Varchar | 15 | Identifier for command parameter |
| CMD_ID | Varchar | 15 | Command ID |
| PARAM_NAME | Varchar | 100 | Command parameter name |
| PARAM_VALUE | Varchar | 100 | Command parameter value |

FIG. 2t: CMD_DATA, Communication Command Data Table

| Column Name | Type | Length | Comments |
|---|---|---|---|
| CMD_DATA_ID | Varchar | 15 | Identifier for command data |
| CFG_ID | Varchar | 15 | Command ID |
| NAME | Varchar | 100 | Command parameter name |
| Comment | Varchar | 200 | Comment (optional) |

FIG. 2u: CMD_DATA_PARAM, Communication Command Data Parameter Table

| Column Name | Type | Length | Comments |
|---|---|---|---|
| CMD_DATA_PARAM_ID | Varchar | 15 | Identifier for command data parameter |
| CMD_DATA_ID | Varchar | 15 | Identifier for command data |
| PARAM_NAME | Varchar | 100 | Command parameter name |
| PARAM_VALUE | Varchar | 200 | |

FIG. 2v: CMD_GROUP, Communication Command Group Table

| Column Name | Type | Length | Comments |
|---|---|---|---|
| CMD_GROUP_ID | Varchar | 15 | Identifier for group of commands |
| SUB_CMD_ID | Varchar | 15 | Foreign key to command table |
| ORDER | Number | 10 | Default "0" |

FIG. 2w: EVTHDLR, Communication Event Handler Table

| Column Name | Type | Length | Comments |
|---|---|---|---|
| EVTHDLR_ID | Varchar | 15 | Identifier for event handler |
| PROF_ID | Varchar | 15 | The channel driver profile ID for the channel driver profile from which this event originated. |
| NAME | Varchar | 100 | Event name |
| MEDIA_EVENT | Varchar | 100 | Identifier for event |
| ORDER | Number | 10 | Default "0" |
| EVT_RESP_ID | Varchar | 15 | Foreign key to event response table |
| Comment | Varchar | 200 | Comment (optional) |

FIG. 2x: HDLR_PARM, Communication Event Handler Parameter Table

| Column Name | Type | Length | Comments |
|---|---|---|---|
| HDLR_PARM_ID | Varchar | 15 | Identifier for event handler response |
| EVT_HDLR_ID | Varchar | 15 | Identifier for event handler |
| PARAM_NAME | Varchar | 100 | Event parameter name |
| PARAM_VALUE | Varchar | 200 | Event parameter value |

FIG. 2y: EVTRESP, Communication Event Response Table

| Column Name | Type | Length | Comments |
|---|---|---|---|
| EVTRESP_ID | Varchar | 15 | Identifier for event response |
| CFG_ID | Varchar | 15 | Identifier for configuration |
| NAME | Varchar | 100 | Event parameter name |
| COMMENT | Varchar | 200 | Comment (optional) |

FIG. 2z: EVTRESP_PARM, Communication Event Response Parameter Table

| Column Name | Type | Length | Comments |
|---|---|---|---|
| RESP_PARM_ID | Varchar | 15 | Identifier for event response parameter |
| EVTRESP_ID | Varchar | 15 | Identifier for event response |
| PARAM_NAME | Varchar | 100 | Event response parameter name |
| PARAM_VALUE | Varchar | 200 | Event response parameter value |

FIG. 2aa: EVTLOG, Communication Event Log Table

| Column Name | Type | Length | Comments |
|---|---|---|---|
| EVTLOG_ID | Varchar | 15 | Identifier for event log |
| CFG_ID | Varchar | 15 | Foreign key for configuration table |
| NAME | Varchar | 100 | Event parameter name |
| COMMENT | Varchar | 200 | Comment (optional) |

FIG. 2bb: LOG_PARM, Communication Event Log Parameter Table

| Column Name | Type | Length | Comments |
|---|---|---|---|
| LOG_PARM_ID | Varchar | 15 | Identifier for event log parameter |
| EVTLOG_ID | Varchar | 15 | Identifier for event log |
| PARAM_NAME | Varchar | 100 | Event log parameter name |
| PARAM_VALUE | Varchar | 200 | Event log parameter value |

FIG. 2cc: EVTRESP_LOG Event Response – Event Log Table

| Column Name | Type | Length | Comments |
|---|---|---|---|
| RESP_LOG_ID | Varchar | 15 | Identifier for response log |
| EVTRESP_ID | Varchar | 15 | Identifier for event response |
| EVTLOG_ID | Varchar | 15 | Identifier for event log |
| LOG_TYPE | Varchar | 100 | Type of EventLog declaration specified in EventResponse definition. |

SYNCHRONIZATION OF COMMUNICATION CONNECTION STATE WITH COMMUNICATION USER INTERFACE

CROSS-REFERENCE TO RELATED APPLICATIONS

This application is a continuation of application Ser. No. 09/823,531, filed on Mar. 31, 2001 now U.S. Pat. No. 8,601, 492, entitled "User Interface for Multi-Channel Communication" and naming Mingte Chen, Anil K. Annadata, and Kuang Huang as inventors, the parent application being incorporated herein by reference in its entirety.

This application relates to application Ser. No. 09/823,590, filed on Mar. 31, 2001, entitled "System and Method for Multi-Channel Communications Queuing" and naming Anil K. Annadata, Wai H. Pak, and Rohit Bedi as inventors, the application being incorporated herein by reference in its entirety.

This application relates to application Ser. No. 09/823,770, filed on Mar. 31, 2001, entitled "System and Method for Maintaining Real-Time Agent Information for Multi-Channel Communication Queuing" and naming Anil K. Annadata, Wai H. Pak, and Mingte Chen as inventors, the application being incorporated herein by reference in its entirety.

This application relates to application Ser. No. 09/823,828, filed on Mar. 31, 2001, entitled "Adaptive Communication Application Programming Interface" and naming Mingte Chen, Anil K. Annadata, and Leon Chan as inventors, the application being incorporated herein by reference in its entirety.

This application relates to application Ser. No. 09/823,835, filed on Mar. 31, 2001, entitled "Multi-Channel Media Independent Server" and naming Mingte Chen, Anil K. Annadata, and Leon Chan as inventors, the application being incorporated herein by reference in its entirety.

This application relates to application Ser. No. 09/823,769, filed on same Mar. 31, 2001, entitled "Configurable Media-Independent Server" and naming Anil K. Annadata and Mingte Chen as inventors, the application being incorporated herein by reference in its entirety.

This application relates to application Ser. No. 09/823,678, filed on Mar. 31, 2001, entitled "An Extensible Interface for Inter-Module Communication" and naming Wai H. Pak as inventor, the application being incorporated herein by reference in its entirety.

COPYRIGHT NOTICE

Portions of this patent application contain materials that are subject to copyright protection. The copyright owner has no objection to the facsimile reproduction by anyone of the patent document, or the patent disclosure, as it appears in the Patent and Trademark Office file or records, but otherwise reserves all copyright rights whatsoever.

BACKGROUND OF THE INVENTION

1. Field of the Invention

The present invention relates to communication using multiple communication channels of different media types.

2. Description of the Related Art

In today's emerging technological and information world, companies are interacting with their customers, potential customers and other contacts through a wide variety of different communication channels. Such communication channels include face-to-face, telephone, fax, email, voicemails, wireless communication, Internet information inquiries via call me now and call me later, Internet collaborative sessions, paging and short messaging services. With all these communication channels, companies are faced with managing each customer interaction while meeting service levels and maximizing customer satisfaction. In addition, companies are faced with optimally staffing and training their workforce to deal with customers through these communication channels whether through their customer support center(s), telebusiness organizations, or their sales, marketing, and service professionals.

Currently, many companies have dedicated email inboxes, fax inboxes, and voicemail boxes defined for specific business areas as well as automated call distributors. Employees called agents are assigned to poll and manage the support requests from customers for each communication channel. Combined with the traditional call queues for inbound telephone calls, each agent is tasked with managing his or her work using all these communication channels while not having any visibility to the queue status and priorities of each customer support request and/or communication channel.

Most communication software is designed to work with a single communication device or type of communication channel. If a company wishes to implement a customer support center where agents can communicate using multiple communication channels of different media types, typically the company must purchase different software products to handle each media type because of the different communication protocols involved. For example, normally an email server is sold separately from software that can receive data via wireless access protocol. Because different products must be purchased, agents must learn to use a different user interface for each media type of the multiple communication channels. Efficiency of an agent typically degrades when he or she must remember different user interfaces for communicating with customers via different media types.

With customer support centers handling very large numbers of customer support requests daily, increasing the efficiency of each agent in responding to each customer request by only seconds can produce enormous cost savings for the customer support center.

Thus, it is desirable to provide a system that includes a universal queue strategy capable of assigning, routing, and queuing work items from multiple channels of communications to an agent having the appropriate skills to respond to the request. The system should enable the agent to view and manage his or her work items for all communication channels. Such a system reduces the response times and increases customer satisfaction, while balancing priorities amongst work items in multiple communication channels.

What is needed is a user interface that allows an agent to receive and respond to customer support requests as efficiently as possible. The user interface should provide a consistent interface independent of the media type of the communication channel. The user interface should enable the agent to receive and respond to events such as customer support requests and send outgoing commands to a communication channel. The user interface should allow the agent to simultaneously work on multiple active work items independently of the media types of the communication channels involved. The user interface should provide the capability for the agent to accept new work items, release completed work items, suspend active work items, and resume suspended work items. The user interface should allow the user to work interactively with the customer for communication channels providing interactive communication, such as communication channels for telephone and web collaboration.

SUMMARY OF THE INVENTION

The present invention provides a user interface and method for communicating using multiple communication channels of different media types. The method includes obtaining an event communicated via an incoming communication channel, where the event corresponds to a work item available to an agent. A notification of the work item is provided via the user interface. The method includes receiving an activation of a work item object of the user interface, where the work item object is associated with the work item. The method includes issuing a command associated with the activation of the work item object to an outgoing communication channel.

The user interface enables the agent to work using different communication channels while presenting a consistent interface independent of the media type of the communication channel.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features and advantages made apparent to those skilled in the art by referencing the accompanying drawings.

The use of the same reference symbols in different drawings indicates similar or identical items.

FIGS. 2a through 2cc show examples of tables corresponding to table names in FIG. 2.

DETAILED DESCRIPTION

The following is intended to provide a detailed description of an example of the invention and should not be taken to be limiting of the invention itself. Rather, any number of variations may fall within the scope of the invention which is defined in the claims following the description.

FIGS. 1A through 1D are a diagram of one embodiment of a client/server system 100 for enabling agents to respond to customer support requests and/or information requests via multiple communication channels of different media types. These media types include, but are not limited to, telephone, email, fax, web collaboration, Internet call me now and call me later, web chat, wireless access protocol, paging, and short messaging services. The term customer is used herein to include individuals and contact persons at businesses that are customers of the company, potential customers and other persons with whom a customer support agent communicates.

Figure 1A:
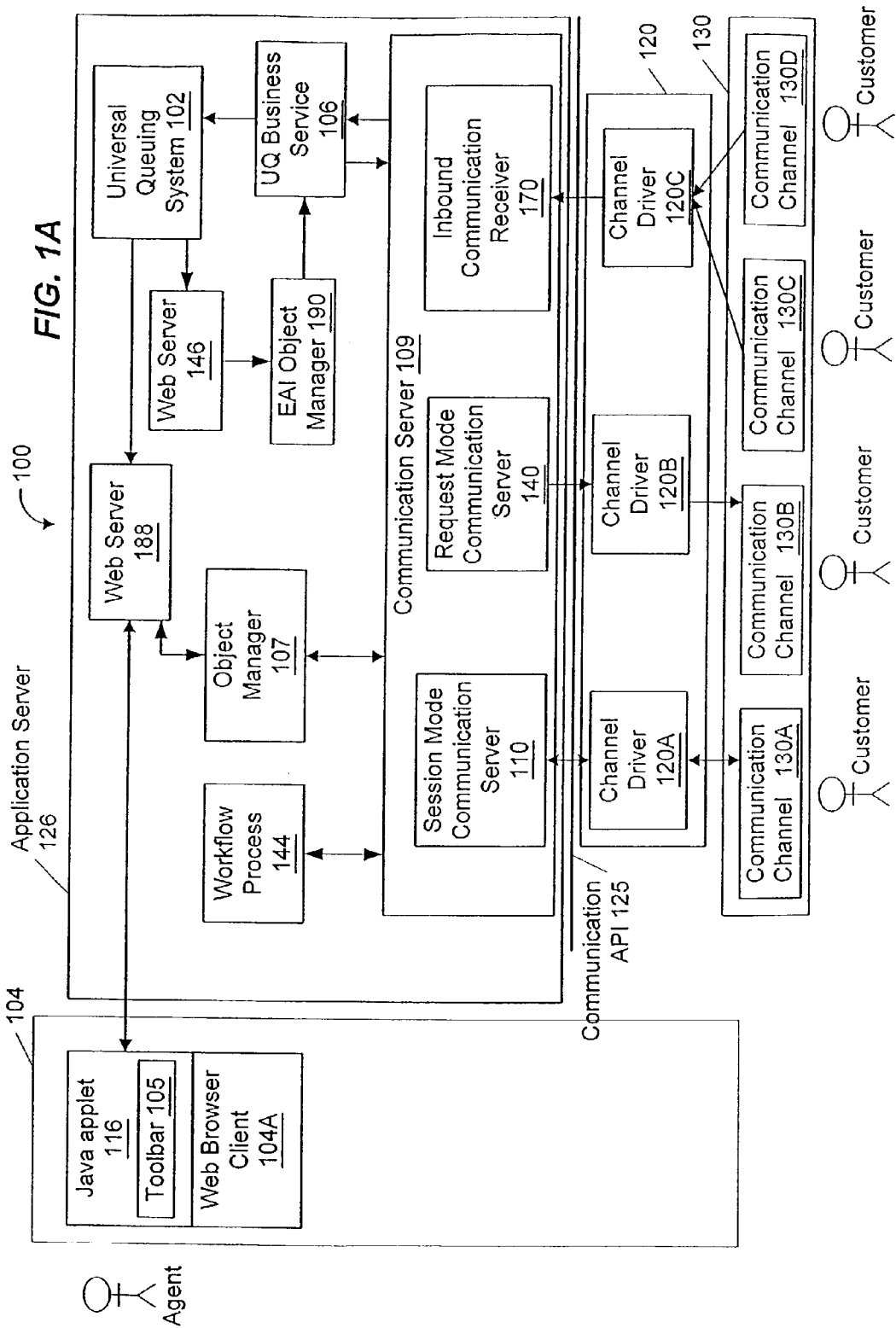
FIGS. 1A through 1D are a diagram of one embodiment of a system for enabling and scheduling agents to respond to customer support requests and/or information requests via multiple communication channels of different media types.

FIG. 1A shows that four customers have submitted customer support-requests to the client/server system 100 and one agent is responding to customer support requests. The four customers submitted the customer support requests via four communication channels 130, such as communication channels 130A, 130B, 130C, and 130D. In one embodiment, at least two of the four communication channels support different media types.

In accordance with the present invention, client/server system 100 includes a universal queuing (UQ) system 102 capable of assigning, routing, and queuing work items from multiple channels of communication to an agent having the appropriate skills to respond to a customer support request. The term work item refers to a request from a customer that requires a response from an agent assigned by client/server system 100, such as responding to a customer support request in the form of a telephone call, email, fax or other communication of a different media type. A work item can be initiated when an event such as an incoming customer support request arrives or by an agent using a user interface to client/server system 100.

Client/server system 100 also includes a communication server 109 that enables agents to use communication channels of different media types to communicate with customers. Communication server 109 handles events such as the arrival of incoming customer support requests from a channel driver 120 such as one of channel drivers 120A, 120B, and 120C. Each channel driver 120 communicates with a communication channel 130 such as one of communication channels 130A, 130B, 130C and 130D.

Interaction between UQ system 102 and communication server 109 occurs when, for example, communication server 109 receives and routes an incoming customer request as a work item to UQ system 102 for assignment to an agent. UQ system 102 assigns an agent to the work item and sends the work item back to communication server 109 for communication to the assigned agent.

Web browser client 104A includes a web browser program such as Microsoft's Internet Explorer running on a client computer system (not shown). The web browser client 104A communicates with a web server 188. Application server 126 in client/server system 100 performs functions for and sends information to web browser client 104A via web server 188, which provides web pages for web browser client 104A to display. Web server 188 can download program instructions, such as Java applet 116, to the web browser client 104A to provide additional functionality, such as a user interface.

Web browser client 104A is shown including a toolbar 105. One of skill in the art will recognize that other user interfaces providing the functionality of toolbar 105 can be implemented using a variety of different display formats to interface with multiple communication channels of different media types within the scope of the invention. Toolbar 105 is presented as part of a user interface.

In one embodiment, application server 126 of client/server system 100 includes object manager 107, session mode communication server 110, request mode communication server 140, inbound communication receiver 170, UQ system 102, web server 188, web server 146, Enterprise Application Interface (EAI) object manager 190, and workflow process 144. In one embodiment, communication between components in application server 126 is enabled using a suitable inter-process communication protocol in conjunction with transfer control protocol/Internet protocol (TCP/IP) as known in the art.

UQ business service 106 allows communication server 109 to request information from UQ system 102, which returns the information via web server 146, and EAI object manager 190. In one embodiment, both session mode communication server 110 and inbound communication receiver 170 can communicate with UQ system 102. Other embodiments can communicate with a third party queuing system for maintaining work item queues and assigning agents to work items.

Communication server 109 includes session mode communication server 110. Communication server 109 may optionally include one or both of request mode communication server 140 and inbound communication receiver 170. It is important to note that the functionality provided by servers 110, 140, and 170 can be implemented on one server computer system or distributed across two or more server computer systems. Communication server 109 handles all communication between agents and customers via communication channels 130 of one or more media types. Communication server 109 is not media-specific and has no knowledge of communication channels or media.

To communicate with multiple communication channels of different media types, communication server 109 is designed to communicate with a channel driver 120 such as one of channel drivers 120A, 120B, and 120C. A channel driver 120 is written according to Communication Application Program Interface (API) 125. Communication API 125 provides an interface for third party vendors of communication devices and software (e.g., middleware vendors for communication devices) to provide a channel driver 120 so that their products are compatible with application server 126. By implementing a channel driver 120, vendors can take advantage of the customer support center management features and multi-media communication channel capabilities of application server 126.

Communication API 125 is designed to provide flexibility to third party vendors for integrating their products. In the implementation of a channel driver, a vendor defines the commands the vendor's communication channel 130 understands so that communication server 109 can issue commands for the communication channel 130 to perform. Normally these commands are issued when session mode communication server 110 is presenting a user interface to the agent, although inbound communication receiver 170 also can send commands in some circumstances.

In addition, the vendor defines the events that the vendor's communication channel 130 provides regarding activity of a specific communication channel 130. Finally, the vendor provides a channel driver 120 implementation, such as a dynamic link library (.DLL file), for performing each command and generating and providing each event. The channel driver 120 implementation is required by communication API 125 to include code to instantiate a driver object and at least one service object.

By requiring the vendor to provide facilities for the communication server 109 to issue commands to and to receive information from the vendor's communication channel 130, communications API 125 enables communications server 109 to operate independently of the communication channel 130 media type and specific protocols to communicate with the vendor's communication device or software.

Figure 2:
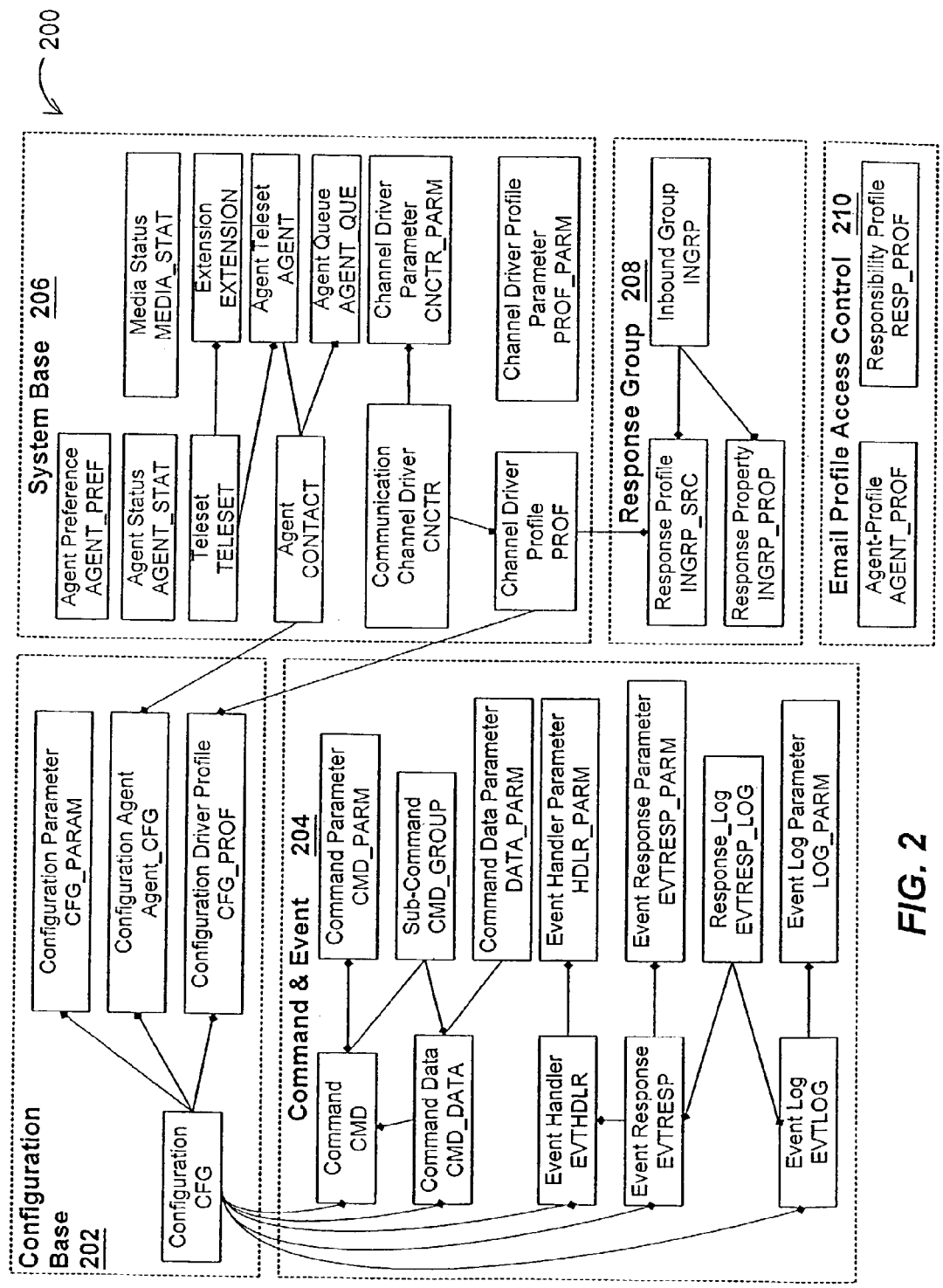
FIG. 2 shows an example of a database schema for the system of FIGS. 1A through 1K.

Referring to FIG. 2, an example of a database schema 200 that can be used by client/server system 100 (FIG. 1A) for storing and communicating channel driver information, agent limitations on media access, commands and events, inbound task management, agent preferences, agent status, media status, communication channel configurations, multiple queue support, and agent management is shown. Database schema 200 includes data structures for configuration base 202, command and event 204, system base 206, response group 208, and email profile access control 210.

FIGS. 2a through 2cc show examples of tables corresponding to table names in FIG. 2. Note that FIG. 2 does not indicate all of the relationships between the tables for simplicity, and that many instances of a table may exist for a particular configuration, depending on the number and types of communication channels authorized. Additionally, one skilled in the art will realize that this collection of tables, the parameters included in each table, and the storage space allowed for the parameters, is one example of how the database schema may be configured, and that other suitable arrangements can be used in accordance with the present invention.

The tables in FIGS. 2a, 2b, 2c, and 2d are part of system base 206 and store channel driver information and channel driver parameters. The tables of FIGS. 2a and 2b store the general information for a channel driver, such as channel drivers 120A, 120B, and 120C, and can be used by any customer support center configuration. The typical data stored in these tables are the file name of the channel driver DLL, the media type of the associated communication channel 130 (e.g. email, fax, etc.), a media string which is used by communication server 109 at run time to invoke a media service for the channel driver, the complete list of channel driver parameters, and the default value for each channel driver parameter. The parameters INBOUND_FLG and OUTBOUND_FLG of table CNCTR (FIG. 2a) indicate whether the channel driver 120 supports inbound and/or outbound communications.

Customer support centers can establish configurations that define the groups of agents that have similar requirements to communicate, therefore requiring access to the same communication channel 130. For example, salespersons within a company may need the ability to communicate via wireless access protocol, whereas telephone operators may not. A configuration can be established for each group within the company. A channel driver profile allows more than one customer support center configuration to share a single channel driver 120, with each additional channel driver profile overriding the values of some channel driver parameters such as the location of the channel driver DLL. For example, due to the network architecture of the company, salespersons for the company in Phoenix may use a different channel driver 120 than salespersons in Palo Alto. A channel driver profile will enable the Phoenix and Palo Alto salespersons to use the same channel driver but point to different DLLs. The term channel driver 120 is used herein to include at least one channel driver profile providing default values for the channel driver parameters.

The tables in FIGS. 2c and 2d store the channel driver profile for a particular customer support center configuration and the channel driver profile is not shared or used by other customer support center configurations. Typically, an administrator uses the table CNCTR_PARM to override a default value for a channel driver parameter for the particular customer support center configuration. Referring to FIG. 2a, the string stored in the variable CNCTR_MEDIA_STR is based on a list of names of communication media supported by the channel driver 120. An administrator enters the name of the media in the CNCTR_MEDIA_STR field in character string format. The string stored in this field is used to determine the channel driver 120 to issue a command or from which an event originated. If one channel driver 120 supports multiple types of communication media, the administrator creates one record for each media type. The following examples show the parameters in the CNCTR table for telephone, email, and web chat media:

{"XYZ Phone Driver", "Telephone", "xyz.dll", "Y", "Y", "XYZ Phone Implementation", "N"}, {"XYZ Email Driver", "Email", "xyz.dll", "Y", "Y", "XYZ Email Implementation", "N"}, {"XYZ Web Chat Driver", "Web Chat", "xyz.dll", "Y", "Y", "XYZ Web-Chat Implementation", "N"}

Note that when a work item is submitted to UQ system 102 (FIG. 1A) for agent assignment, the CNCTR_MEDIA_STR is also passed with the work item to help UQ system 102 to identify an agent with skills in using that media type.

An example of an algorithm for determining the list of channel drivers 120 for a particular agent is as follows:

1. Determine the configuration ID for the agent by searching AGENT table (FIG. 2j).
2. For the configuration ID, search the CFG_PROF table (FIG. 2o) for the list of channel driver profiles associated with the configuration.
3. For each of channel drivers 120, load the channel driver information and channel driver parameters from CNCTR, CNCTR_PARM, PROF, and PROF_PARM tables (FIGS. 2a-2d, respectively).

An example of an algorithm for loading a list of channel drivers 120 upon the agent logging in to client/server system 100 is as follows:

1. For each of channel drivers 120,
   a. If the DLL has not loaded, load the DLL
   b. Pass the channel driver parameters and ask the channel driver for the handle of a driver object.
   c. Request the handle of a service object by passing the media type of the channel driver identified in CFG_PROF (FIG. 2o) as being associated with the agent.
2. End Loop By default, an agent is authorized to access all channel drivers 120 associated with the configuration to which the agent belongs. For example, if the agent belongs to "Customer support center 1," all channel driver profiles configured in "Customer support center 1" are accessible for all agents in "Customer support center 1" by default. The administrator can further limit the agent's access to channel drivers 120 using table AGENT_LIM (FIG. 2m) that lists the channel driver profiles the agent cannot access.

Agent preferences are stored in table AGENT_PREF (FIG. 2e) in a centralized database so that an agent's settings are available independently of the type of client or communication channel being used. A user interface for modifying the settings is also supplied in an embodiment of the present invention.

Embodiments of the present invention support multiple communication media channels and agent assignment with UQ system 102 (FIG. 1A). Table AGENT_STAT (FIG. 2f) stores the current working status of a particular agent for all types of media that the agent is authorized to use. From this table, the administrator can see a list of media types that agent is currently authorized to access and the status of each media type.

When the "NOT_READY_FLG" parameter in table AGENT_STAT (FIG. 2f) indicates that an agent is not ready to take work items, UQ system 102 (FIG. 1A) will not assign any work items to the agent. The "BUSY_FLG" parameter indicates that the agent is busy.

Table AGENT_STAT is updated mainly at run time. When the agent first logs on using the user interface, one record for each media type that the agent is authorized to access is created. For example, {"agent_emp_id", "Phone Control", " ", " ", "1234", " "},
{"agent_emp_id", "Email/Fax", " ", " ", "1234", " "},
{"agent_emp_id", "Web Chat", " ", " ", "1234", " "}

The records are updated according to the agent's working status. For example

{"agent_emp_id", "Phone Control", "Y", " ", "1234", "Y"} indicates that agent is not ready but is talking on the phone, {"agent_emp_id", "Email/Fax", "Y", " ", "11234", " ".} indicates that the agent is not ready to accept Email/Fax type of work, and {"agent_emp_id", "Web Chat", "N", " ", "1234", "Y"} indicates that the agent is ready to accept web chat type work and he or she is currently working on a web chat session.

Referring to table MEDIA_STAT (FIG. 2d), the parameter "MEDIA_OBJECT_STR" for phone is the agent's extension number. For email, it is the mailbox name or the sender's email address. For fax, it is the fax number. The form of the content of MEDIA_OBJECT_STR is defined in each of the channel drivers 120.

"WORKING_SINCE_DT" is the time the agent starts to talk on the phone, or the time the agent starts to work on a work item such as an email or fax.

"WORK_ITEM_STR" is the unique string to identify the work item and the value of the field is determined by communication server 109. The MEDIA_STAT table is updated at run time to reflect the agent's current work status. An example of an agent's data records at run time is as follows:

{"agent_id", "Phone Control", "Ext. 5216", "6/25/2000 12:34:45", "phone_item_str", "1-1S2-X7E"}, {"agent_id", "Email", "info@company.com", "6/25/2000 11:34:00", "email_item_str", "1-1S2-X7D"}

The above records show that the agent is currently talking on extension 5216 and is working on an email sent to info@company.com.

Multiple extensions and multiple queues are supported in client/server system 100 (FIG. 1A) using tables TELESET, EXTENSION, and AGENT_QUE, FIGS. 2h, 2i, and 2j, respectively. The following terms are referenced in FIGS. 2h, 2i, and 2j. The term automatic call distribution (ACD) extension refers to a type of extension that is used to log in to an ACD queue associated with an ACD switch such as ACD switch 130E. Once an extension logs in to the ACD queue, the ACD switch begins to dispatch customer calls to the extension. One ACD extension can log in to one or more ACD queues.

The term standard extension refers to a type of telephone extension that is not allowed to log in to the ACD queue. Standard extensions are mainly used for dialing outbound calls or answering internal calls. The ACD switch does not dispatch customer calls to a standard extension.

The term agent ID refers to an identifier used by client/server system 100 to identify the agent. In order for client/server system 100 to be aware of the agent's availability, each customer support center agent is assigned an agent ID. When the agent logs in to a communication channel having an ACD switch 130E, the agent ID is provided to the ACD switch 130E. Depending upon the configuration of the system, either the ACD switch 130E or UQ system 102 determines an available agent ID for the work item. Then either the ACD switch 130E dispatches the customer call to the ACD extension of the agent ID or, when UQ system 102 is used to assign agents, communication server 109 uses one of channel drivers 120 to dispatch the customer call to the ACD extension of the agent ID.

"Multiple DN" refers to multiple extensions configured for one telephone handset, and one or more extensions are ACD extensions.

"Multiple queue" means that one ACD extension can log in to multiple queues. In general, since an ACD queue is a list of agent IDs, as long as the agent ID is acceptable for ACD queue, any ACD extension can be used to login to ACD queue.

In one embodiment, a method for determining the list of extensions for an agent includes searching by the agent's ID in the AGENT table (FIG. 2j) to find the primary Teleset ID in the ACTIVE_TELESET_ID parameter, which identifies the primary handset used by the agent. The extension list is then determined from the DN_EXT parameter in the EXTENSION table (FIG. 2i). Once the list of extensions is found, all extensions that the agent uses can login to all ACD queues defined in the AGENT_QUE tables (FIG. 2l) for that particular agent.

As described above, customer support centers can establish configurations that define the groups of agents that have similar requirements to communicate, therefore requiring access to the same communication channel 130. Configuration base 202 includes tables about configurations. CFG table (FIG. 2n) contains information about configurations. Configuration data includes a configuration name and an INGRP_FLAG indicating whether this configuration is for inbound response groups used in inbound communication receiver 170. CFG_PROF table (FIG. 2o) is the configuration/channel driver profile relationship table showing which channel driver profiles belong to each configuration. Each configuration has a single channel driver profile.

AGENT_CFG table (FIG. 2p) is the agent/configuration relationship table showing which agents belong to each configuration.

CFG_PARM table (FIG. 2q) is the configuration parameter table. A name and a value are provided for each configuration parameter. An ACTIVE_FLG field is a flag indicating whether the value of the configuration parameter is active.

The command and event data structure 204, includes information describing commands and events implemented by channel drivers 120. This information includes associating each command with a channel driver 120 and each event with a channel driver 120.

CMD table (FIG. 2r) includes commands for each channel driver 120. As described above, a vendor providing a channel driver 120 specifies the commands that it supports. A command is issued to channel driver 120 by communications server 109 to perform a command using communication channel 130. Every click on a button of toolbar 105 invokes a command, which is issued to channel driver 120.

A command can have a group of associated commands which operate as subcommands. A group command includes other commands with a Subcommand keyword.

Following is an example of a single command for making a telephone call to a contact.

```
[Command: MakeCalltoContact]                              Command definition
    CmdData          =   "MakeCalltoContact"    Command parameter
    DeviceCommand    =   "MakeCall"             Command parameter
    Description      =   "Make Call to Contact" Command param.
    Hidden           =   TRUE                   Command parameter
[CmdData: MakeCalltoContact]                              Command data def.
    BusComp          =   "Contact"              Command parameter
    RequiredField.'Work Phone #'        ="?*"   Command parameter
    Param.PhoneNumber =    "{Work Phone # : Lookup}"   Command
                                                       Parameter
```

Following is an example of a group command for making a telephone call to a contact:

[Command: MakeCallGroup]
Hidden=TRUE
SubCommand=MakeCalltoPhone
SubCommand=MakeCalltoSRContact
SubCommand=MakeCalltoSROwner
SubCommand=MakeCalltoEmployee Home The following example command can be either a single command or a subcommand.

```
[Command: MakeCalltoPhone]                              Command definition
    CmdData          =   "MakeCalltoPhone"      Command parameter
    DeviceCommand    =   "MakeCall"             Command parameter
    Description      =   "Make Call to {@Phone}" Cmd param
    Hidden           =   TRUE                   Command parameter
[CmdData: MakeCalltoPhone]                              Command data def.
[CmdData: MakeCalltoPhone]                              Command data def.
    RequiredField.'Work Phone #'        ="?*"
    Param.PhoneNumber =    "{@Phone: PhoneTypeLookup}"
```

A command can have a command data section with a CmdData keyword to specify the data parameter in order to communicate with channel driver 120.

When a customer support center configuration includes multiple channel drivers 120, it is then possible for communication server 109 to determine which commands and events are handled by each of channel drivers 120. This configuration can also help distinguish between channel drivers 120 from different vendors that use the same name for commands performing different functions.

Following is an example of a command with a data section having a CmdData keyword.

```
[Command: MakeCalltoContact]
    CmdData         =    "MakeCalltoContact"
    DeviceCommand   =    "MakeCall"
    Description     =    "Make Call to Contact"
    Hidden          =    TRUE
[CmdData: MakeCalltoContact]
    BusComp         =    "Contact"
    RequiredField.'Work Phone #'    ="?*"
    Param.PhoneNumber =    "{Work Phone # : Lookup}
```

The event table contains events that are sent to communication server 109 from channel driver 120. Vendors specify the events that will be sent in channel driver 120. An event response determines how communication server 109 reacts upon receiving each media event. The process of handling an event includes the following: searching for the event handler for the event, querying a customer support center database to determine the appropriate event response, and logging the event.

An example of an event, the event handler, event response, and event log for an InboundCall event are shown below:

```
[EventHandler:OnInboundCall]              first stage, EventHandler
definition
    DeviceEvent  = "EventRinging"         media event
                                          definition
    Response     = "OnInsideCallReceived" EventResponse
                                          declaration
    Filter.Call  = "?*"                   EventHandler
                                          parameter
    Order        = "1"                    EventHandler order
```

```
[EventResponse:OnInboundCallReceived]        second stage, EventResponse
definition
    QueryBusObj   = "Contact"                EventResponse parameter
    QueryBusComp  = "Contact"
    QuerySpec     = "'Work Phone #'='{ANI}'"
    SingleView    = "Service Contact Detail View"
    MultiView     = "Contact List View"
    FindDialog    = "Service Request"
    FindField.CSN = "Ask Caller"
    FindLog       = "LogIncomingCallContactNotFound"   EventLog
declaration
    SingleLog     = "LogIncomingCallContactFound"      EventLog declaration
    Log           = "LogIncomingCallContactNotFound"   EventLog declaration
```

```
[EventLog:LogIncomingCallContactFound]   β EventLog definition
    Display       = "TRUE"               β EventLog parameters
    BusObj        = "Action"
    BusComp       = "Action"
    LogField.Type = "Call – Inbound"
    LogField.'Account Id' = "{Contact.'Account Id'}"
    LogField.'Contact Id' = "{Contact.Id}"
    LogField.Description  = "Inbound call"
    LogField.'Call Id'    = "{ConnID}"
    AfterCall.'ACD Call Duration' = "{@CallDuration}"
```

Each event handler corresponds to an event provided by channel driver 120 and it is sequenced among the event handlers for an event. Each event handler has an event response. An event response can be shared among event handlers. An event response can have multiple event logs, and an event log can be shared among event responses.

When operating in session mode, communication server 109 is under the control of session mode communication server 110. Session mode communication server 110 receives incoming events such as customer support requests and communicates interactively with the agent by controlling a user interface presented to the agent. Preferably the incoming customer support request is communicated to the agent at substantially the same time the customer support request is received by the communication channel 130, with brief intermissions only to allow for processing and transport time in transporting the customer support request. This ensures that the customer's waiting time is minimized, particularly for requests for live interaction with an agent.

When an event such as arrival of an incoming telephone call occurs, the user interface notifies the agent using a notification function to change the user interface to capture the agent's attention. For example, a notification function can cause a button to blink to notify the agent of the phone call. A notification function can also display other information such as information about the caller before the agent picks up the phone. When the agent uses toolbar 105 to accept a telephone call, put a call on hold, or release a call, the user interface sends a command to session mode communication server 110, which communicates with one of channel drivers 120 to issue the command to the communication channel controlling the telephone.

Session mode communication server 110 also handles establishing and maintaining connections to one or more communication channels 130, such as communication channels 130A through 130D. Session mode communication server 110 uses one of channel drivers 120, such as channel driver 120A, to establish the connection. Having a connection to a communication channel enables the agent to receive an incoming work item, such as an email, intended specifically for that agent in real time. The connection can be to a middleware server, to a web server, directly to a media device, or to any other communication intermediary from which the customer can receive a communication. The connection can be established as a TCP/IP socket connection to a middleware server, as an OLE interface such as the IadviseSink interface, or as any other suitable inter-process communication scheme. Each of channel drivers 120 contains all information needed to establish the connection with communication channel 130 so that communication server 109 operates independently of communication channel 130.

Figure 1B:
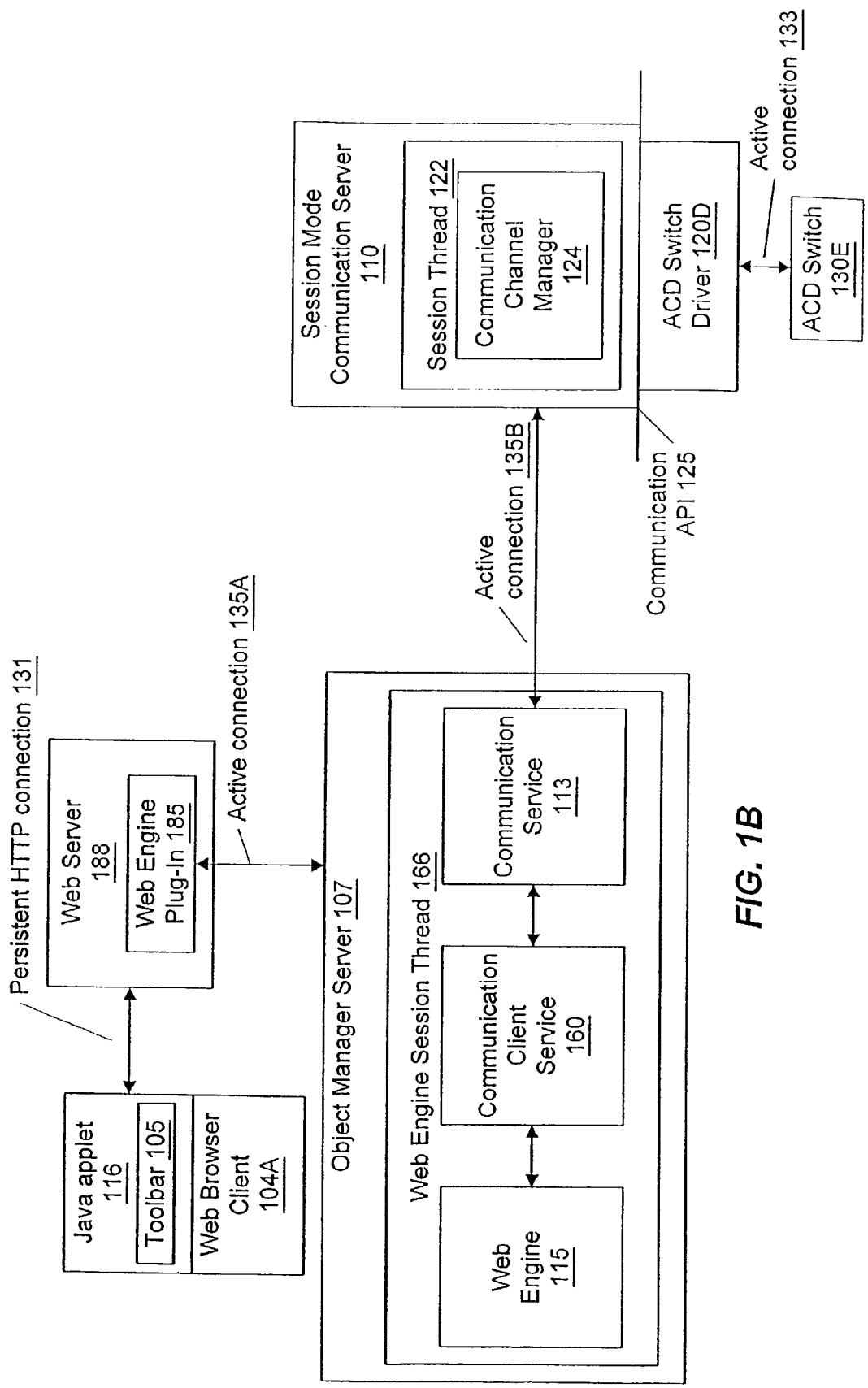

FIG. 1B shows a detailed view of one embodiment of session mode communication server 110. Session mode communication server 110 maintains knowledge of clients 104 to which it is connected, here web browser client 104A. When a communication from communication channel 130 such as ACD switch 130E is received, communication server 109 dispatches the request to the appropriate server component in client/server system 100 for execution.

Session thread 122 represents a session during which an agent interacts with client/server system 100 using web browser client 104A. A customer uses a customer communication device, here a telephone, to access the communication channel. The agent also uses a communication device, such as a telephone headset, to access the communication channel.

Session thread 122 listens for inputs from its web browser client 104A and dispatches notifications of events from ACD switch driver 120D to web browser client 104A. Session thread 122 uses a communication channel manager such as communication channel manager 124 to interact with ACD switch driver 120D. Each channel driver 120 provides an active connection such as active connection 133 between the client and the associated communication channel. Channel driver 120 can be implemented to establish a persistent connection for interactive communication between client 104 and communication channel 130E but providing a persistent connection is not required by communication API 125.

The following examples describe processes that are followed by web browser client 104A during startup, initialization and operation. The processes for web browser client 104A are applicable to other types of clients, as will be explained in further detail below.

When web browser client 104A begins execution:

1. Web browser client 104A downloads program instructions for generating a user interface on the display for the web browser, such as toolbar 105, shown here as implemented using Java applet 116, from web server 188. Java applet 116 also establishes persistent HTTP connection 131 between Java applet 116 and web server 188 so that web server 188 can continuously provide information to web browser client 104A.

2. Web browser client 104A interfaces with session mode communication server 110 via web engine session thread 166. Object manager 107 spawns web engine session thread 166 to interface with web browser client 104A using web engine plug-in 185 and web engine 115. Communication client service 160 provides all communication related to the user interface with web browser client 104A.

3. Communication client service 160 requests the object manager 107 for communication service. Communication service 113, which provides all communications not related to the user interface, is provided.

4. Communication service 113 loads configuration information such as commands, events, agent information and preferences, channel driver information and channel driver parameters.

5. Communication service 113 registers an asynchronous event receiving function with object manager 107 to be invoked when an asynchronous event is subsequently received. The asynchronous event receiving function is also referred to as a callback function. Receiving asynchronous events is described in further detail below.

6. Communication service 113 requests, an active connection 135A between object manager 107 and web engine plug-in 185 and an active connection 135B between communication service 113 and session mode communication server 110. Persistent HTTP connection 131, and active connections 135A and 135B enable session mode communication server 110 to continually push user interface changes to toolbar 105 using Java applet 116.

7. Session mode communication server 110 spawns a session thread such as session thread 122 in response to the connection request.

8. Session thread 122 runs communication channel manager 124.

9. Communication channel manager 124 loads ACD switch driver 120D and passes the channel driver parameters determined by communication service 113.

10. ACD switch driver 120D establishes an active connection 133 to the ACD switch 130E. A vendor implementing channel driver 120 may choose to provide a persistent connection to the communication channel 130, as for telephone connections such as active connection 133. However, a persistent connection is not required by communication API 125.

When the agent performs an activity using web browser client 104A that requires a command to be executed, such as clicking a button on toolbar 105:

1. Communication client service 160 searches the command configuration data previously loaded for the command to invoke. It also collects the data associated with that command and then passes the command and data to communication service 113.

2. Communication service 113 passes the command and data to communication channel manager 124.

3. Communication channel manager 124 then determines which of channel drivers 120 performs the command requested by the client, and passes the command and data to the channel driver 120 such as ACD switch driver 120D for execution.

4. ACD switch driver 120D issues the command to the communication channel 130. In this example, the ACD switch driver 120D issues the command to ACD switch 130E.

When a channel driver 120 such as ACD switch driver 120D needs to push an event (status data or an incoming event such as a customer call) to web browser client 104A:

1. ACD switch driver 120D receives the event and posts the event to communication channel manager 124. This requires asynchronous interruption at session thread 122 for event posting.

2. Communication channel manager 124 pushes the event to communication service 113.

3. Communication service 113 receives the event and executes the registered asynchronous event receiving function.

4. The registered asynchronous event receiving function inserts the event sent from ACD switch driver 120D into an event queue stored inside object manager 107.

5. A frame manager (not shown) running in session thread 122 picks up the event from the event queue and invokes the registered asynchronous event receiving function using communication client service 160.

6. Communication client service 160 asks communication service 113 to process the event.

7. After communication service 113 has processed the event, communication client service 160 continues to communicate with Java applet 116 to control the web browser for user interface changes.

Figure 1C:
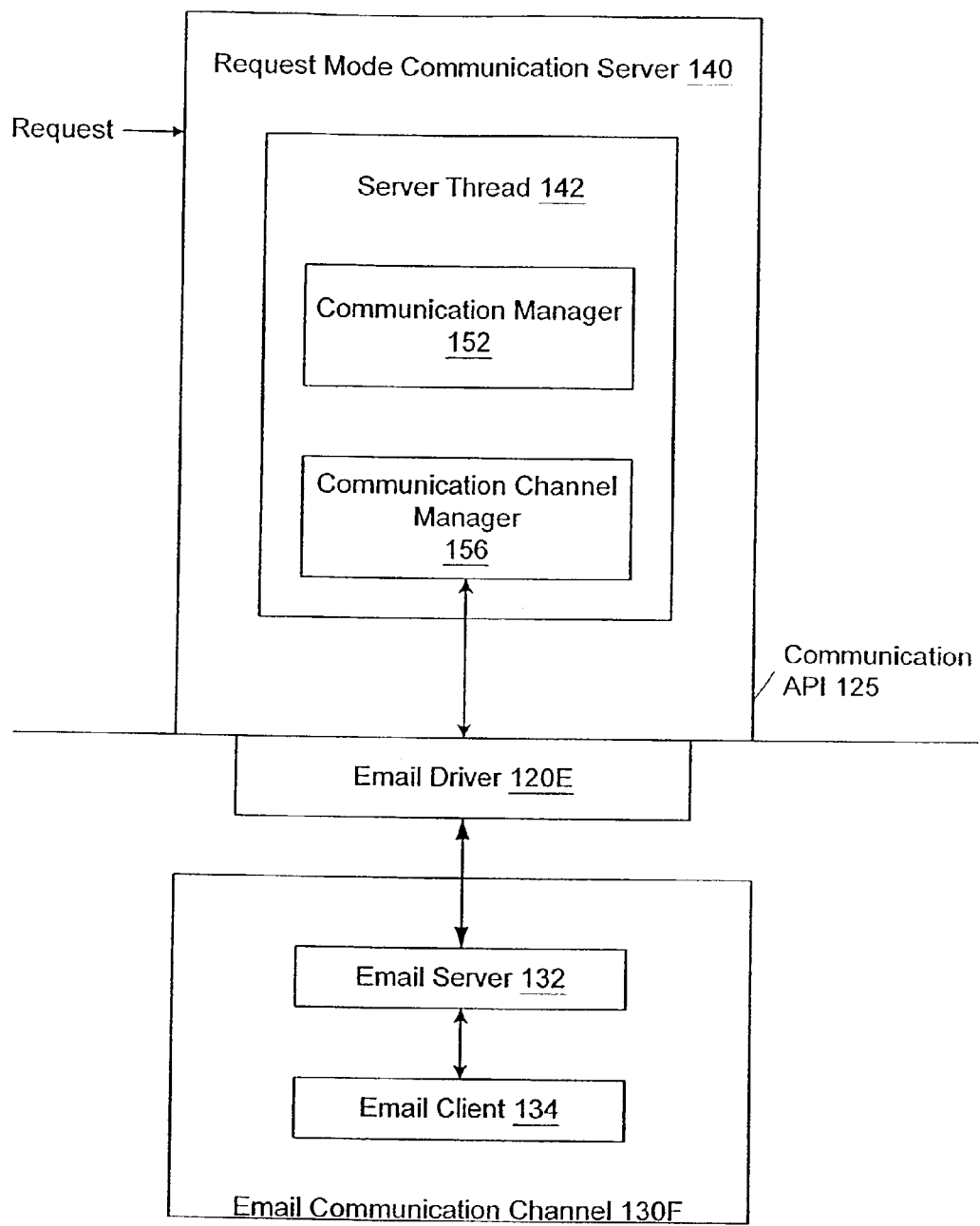

FIG. 1C shows components included in one embodiment of request mode communication server 140. Request mode communication server 140 handles the distribution of information via communication channels according to the request. An example of the operation of request mode communication server 140 is session mode communication server 10 sending a request to request mode communication server 140 to send a large number of emails on its behalf. This enables session mode communication server 110 to devote its resources to controlling the user interface, issuing commands, and handling events.

A request mode server thread such as server thread 142 is spawned when request mode communication server 140 begins execution. Communication manager 152 is loaded to collect data for the request. Request mode communication server 140 determines the appropriate channel driver to handle the request and directs a communication channel manager 156 to load email driver 120E. Communication channel manager 156 dispatches the request and data to email driver 120E, which sends the information to email communication channel 130F. In the embodiment shown in FIG. 1C, email driver 120E sends the emails via email server 132 to email client 134.

As another example of the operation of request mode communication server 140, object manager 107 can send one or more work items from UQ system 102 to request mode communication server 140. Similar to the previous example, a request mode server thread is spawned and communication manager 152 is loaded to collect data for the request. Request mode communication server 140 determines the appropriate channel driver to handle the request and directs a communication channel manager 156 to load an appropriate driver, such as email driver 120E. Communication channel manager 156 dispatches the request and data to the driver, which sends the information to a communication channel.

Figure 1D:
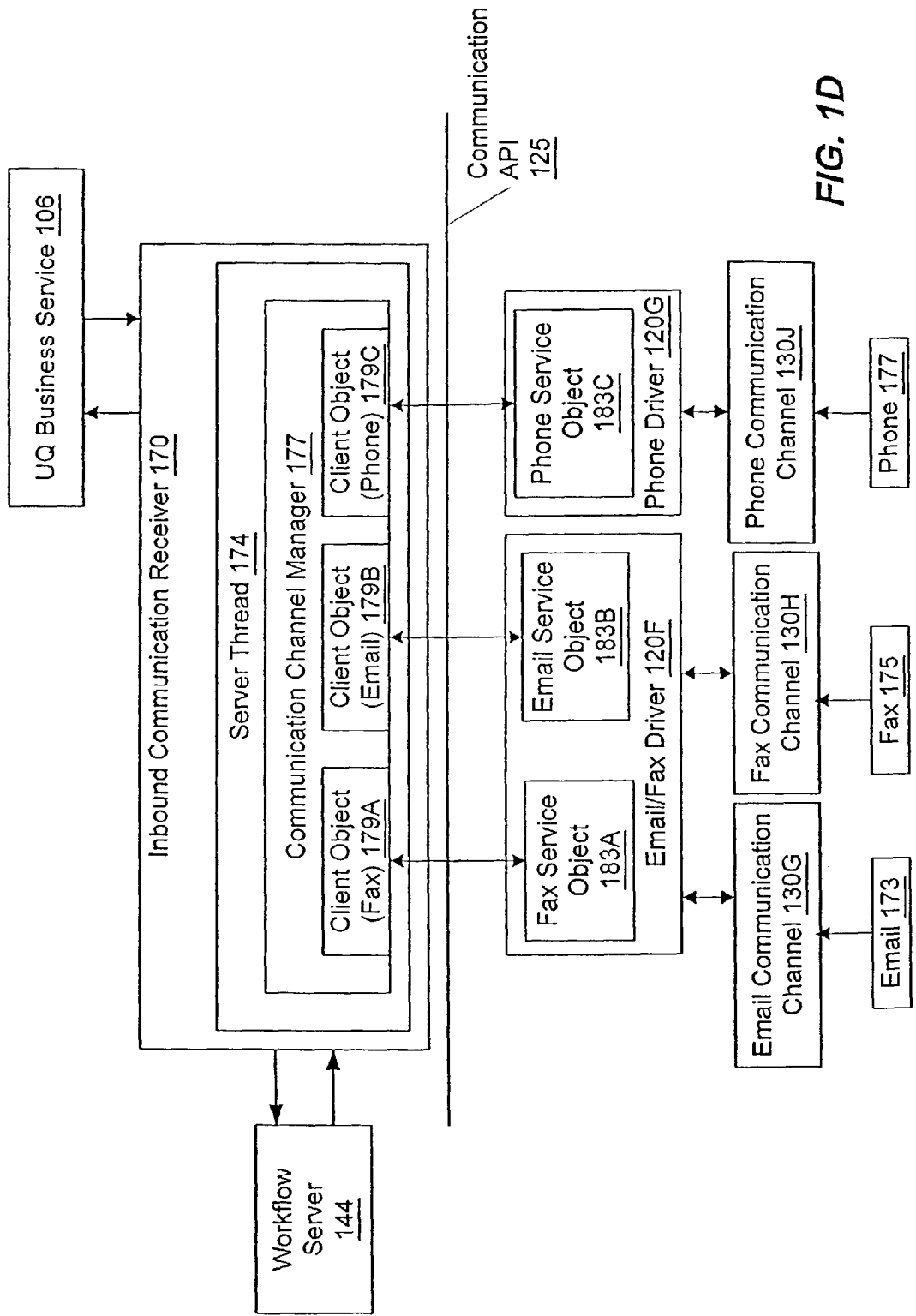

FIG. 1D shows an example of one implementation of inbound communication receiver 170. One embodiment of inbound communication receiver 170 is designed to serve inbound customer support requests with no connection to or knowledge of a client. This contrasts with session mode communication server 110, which communicates with a client to provide a user interface to at least one agent. In one implementation, inbound communication receiver 170 handles customer support requests that can be held in a queue for future processing, such as fax and email, whereas session mode communication server 110 handles high priority support requests that should be processed as quickly as possible, such as telephone calls, to improve customer response time. In another implementation, both inbound communication receiver 170 and session mode communication server 110 can handle high priority support requests.

Inbound communication receiver 170 uses channel drivers 120 such as email/fax channel driver 120F to "listen" for particular types of customer support requests from a common source. Email channel driver 120F handles all email messages directed to a particular email address and all faxes sent to a particular fax number. To avoid overlap among agents, inbound communication receiver 170 can be configured to work with UQ system 102 to assign an agent to the inbound customer support request (email 173 or fax 175) and route the customer support request to a component associated with or representing the assigned agent, such as a client.

Inbound communication receiver 170 is also configured during initialization to recognize events, such as receiving a customer support request, and to include corresponding channel driver information and background profiles to handle recognized events. Background profiles include one or more monitored media objects, such as a list of email addresses, fax numbers, and web-chat end points. For example, email communication channel 130G represents a background profile for info@company.com and fax communication channel 130H represents a background profile for fax number 1-800-123-4567.

Inbound communication receiver 170 spawns a server thread such as server thread 174 to handle inbound events, such as customer support requests. This contrasts to session mode communication server 110, which spawns a session thread such as session thread 122 for each client 104 being used by an agent. Communication channel manager 177 then initializes a service such as fax service object 183A, email service object 183B, or phone service object 183C with the designated background profile.

When the email/fax channel driver 120F receives an incoming customer support request, e.g. new fax 175, fax channel driver 120F posts the event to communication channel manager 177. This posting interrupts the idle state of server thread 174 and causes server thread 174 to invoke communication channel manager 177 to process the event. Communication channel manager 177 determines how to respond to the event based on an event response included in an event response table, such as EVTRESP (FIG. 2$y$), and invokes the appropriate media service, such as fax service object 183A. If the event response also specifies notifying UQ system 102 of the event, the event is then passed to UQ system 102 via UQ business service 106. A response to the event notification is returned to inbound communication receiver 170 via UQ business service 106.

Figure 1E:
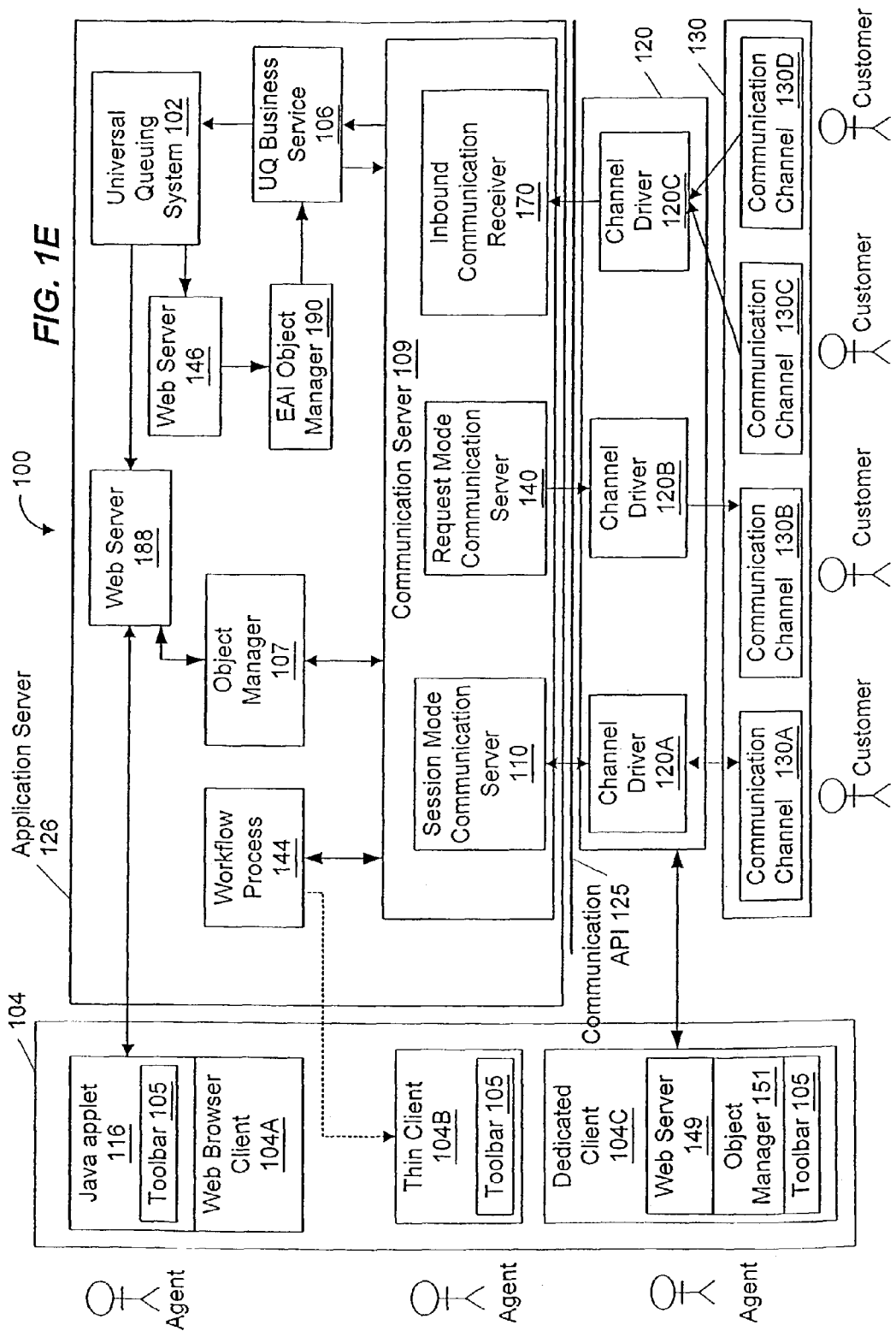
FIG. 1E is a diagram of another embodiment of a system for enabling and scheduling agents to respond to customer support requests and/or information requests via multiple communication channels of different media types.

In alternative embodiments, client/server system 100 can support multiple types of clients 104 having hardware/software configurations that are different from web browser client 104A. FIG. 1E shows an alternative embodiment of client/server system 100 that supports web browser client 104A, thin client 104B, and dedicated client 104C.

Thin client 104B includes one or more client software modules that are installed and executed on the client computer system used by the agent. Thin client 104B provides minimal functionality, with the majority of the functions for thin client 104B are performed by application server 126. It is often desirable to use thin clients so that application programs can be updated once in a centralized location instead of multiple times for each thin client 104B.

Thin client 104B provides more functionality on the client side than web browser client 104A, and can, for example, perform some functions of object manager 107. Thin client 104B also controls the user interface including toolbar 105. If changes are necessary to the functions performed on the client side, a new copy of thin client 104B must be installed on each individual agent's computer system.

Dedicated client 104C includes software modules that perform a significant portion of the functions required to support an agent. Dedicated clients are sometimes referred to as "fat clients," in contrast to the "thin client" designation. If changes are necessary to the functionality provided by dedicated client 104C, a new copy of the dedicated client software modules usually must be installed on the client computer system.

Dedicated client 104C provides even greater functionality than does thin client 104B, including, for example, all functionality provided by object manager 107, web server 188, communication client service 160 (FIG. 1B), and communication service 113. Because dedicated client 104C assumes all responsibility for the user interface and toolbar 105, there is no communication between dedicated client 104*c* and communication server 109, web server 188, web engine plug-in 185 and web engine 115 (FIG. 1B). Dedicated client 104C does include web server 149 that is capable of interfacing with UQ system 102, and object manager 151 to communicate with channel drivers 130.

It is important to note that other types of clients having hardware and software components that are different from clients 104A, 104B, and 104C can also be integrated with client/server system 100.

Communication API

Referring now to FIGS. 1F-1J, communication API 125 is provided in one embodiment of the present invention for channel drivers 120 to communicate with communication server 109. Note that communication server 109 is used in the following discussion of communication API 125 to represent session mode communication server 110, request mode communication receiver server 140, or inbound communication receiver 170.

Figure 1F:
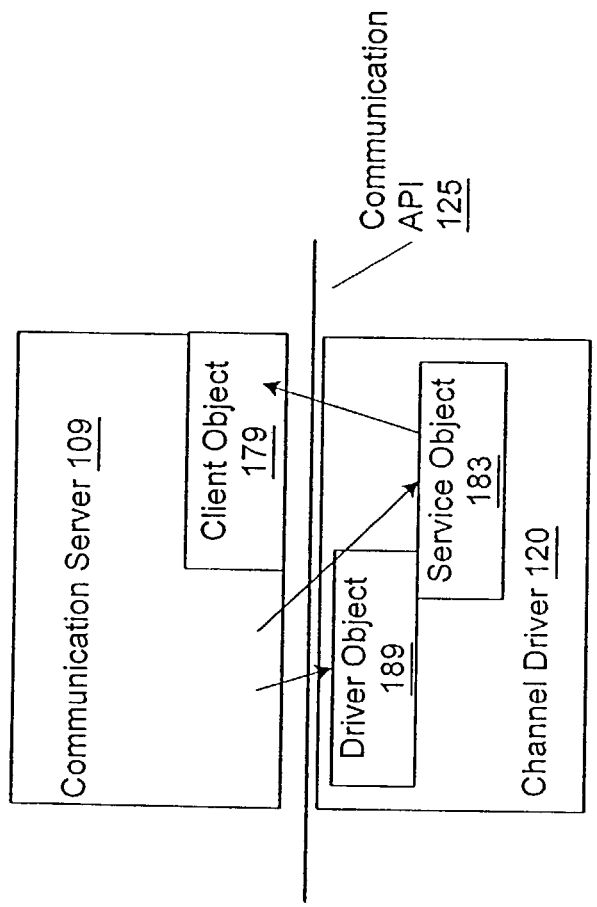
FIG. 1F is a diagram of components included in an implementation of a communication application programming interface.

As shown in FIG. 1F, one embodiment of communication API 125 includes three types of objects: driver objects 189, service objects 183, and client objects 179. Driver objects 189 and service objects 183 are instantiated at the channel driver 120, however client objects 179 are instantiated at communication server 109. Communication server 109 interfaces with driver objects 189 and service objects 183, but only service objects 183 communicate with client objects 179.

Driver objects 189 maintain the instantiation of service objects 183. Any special steps for constructing and destructing service objects 183 can be implemented in driver objects 189. Multiple driver objects 189 can be included to manage different types of media. Also, a single driver object 189 can manage one type of service objects 183 or different types of service objects 183. For example, a single driver object 189 can manage phone, email and fax media.

As an example of the operation of driver objects 189, when communication server 109 is starting up, the channel driver 120 data link library (DLL) is loaded. Communication server 109 calls CreateISCSDriverInstance( ) in channel driver 120 to ask for the construction of a driver object 189. The channel driver 120 returns the driver handle back to communication server 109. The channel driver 120 determines how driver objects 189 are created. If driver objects 189 already exist, for example, the channel driver 120 could simply pass the handle of an existing driver object 189 instead of creating a new one.

In one embodiment, service objects 183 are created by driver objects 189 and provide functionality in the form of device commands to interact with the associated media type. For example, making an outbound call, or sending an outbound email is implemented at service objects 183. A service object 183 is usually associated with a single type of media. For example, there can be service objects 183 for phone media and other service objects 183 for email media. Communication server 109 interfaces directly with service objects 183 to invoke a device command.

After communication server 109 obtains the driver handle, communication server 109 uses a RequestService( ) function to request a service object 183 for the specified media type. The driver returns the handle of the corresponding service object 183 to communication server 109. Communication server 109 then uses this handle in an InvokeCommand( ) function directly to request the corresponding service object 183 for executing a particular type of function.

After communication server 109 obtains the handle to a service object 183, communication server 109 will use the service handle directly to interact with the service object 183. Service objects 183 can inherit facilities from, and/or share resources with, driver objects 189. For example, driver objects 189 can establish and maintain the physical TCP/IP connection to a middleware server of a communication channel 130 and service objects 183 can share the connection with the driver objects 189.

Client objects 179 are instantiated and implemented by communication server 109. The handles to client objects 179 are passed to service objects 183. Service objects 183 can utilize the client handles and invoke the function to be executed at communication server 109.

In one embodiment, every service object 183 has a corresponding client object 179. Therefore, each client object 179 has knowledge of the media type that its corresponding service object 183 is using. Since service objects 183 can each be instantiated for different media from different driver DLLs, this one-to-one relationship allows a client object 179 to know the driver object 189 and service object 183 that initiate the notification when client object 179 receives notification from service object 183.

Figure 1G:
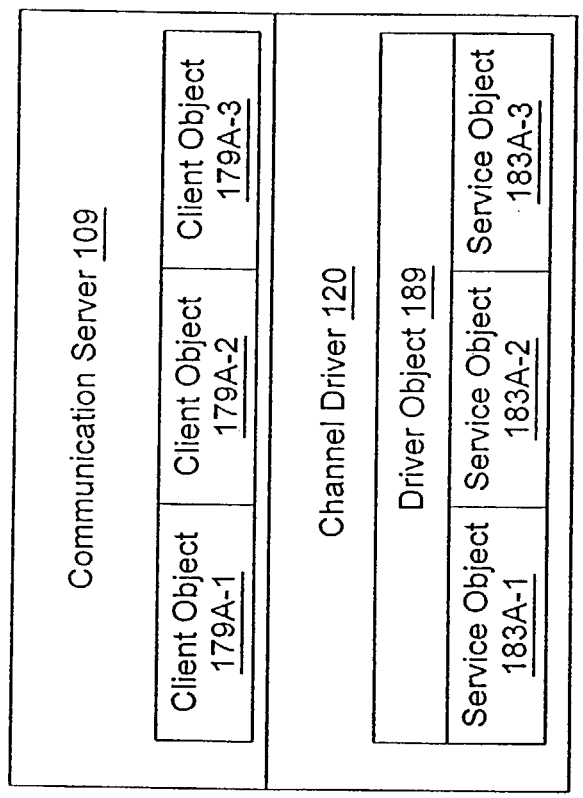
FIG. 1G is a diagram of components included in another implementation of a communication application programming interface.

FIG. 1G shows an example of an architecture for driver object 189 instantiated by channel driver 120. Driver object 189 creates three service objects 183A-1, 183A-2, and 183A-3 of the same media type, such as email. Each service object 183A-1, 183A-2, and 183A-3 has its own dedicated client object 179A-1, 179A-2, and 179A-3, respectively.

Figure 1H:
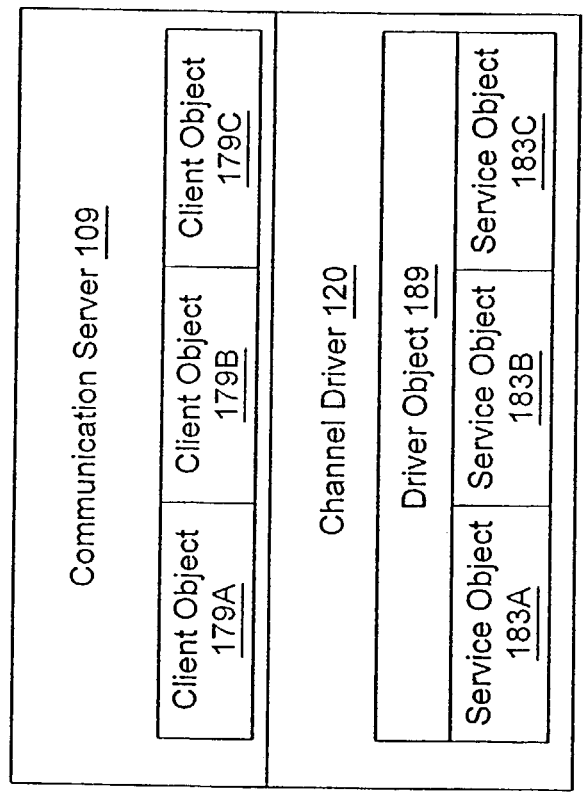
FIG. 1H is a diagram of components included in another implementation of a communication application programming interface.

FIG. 1H shows an alternative architecture for driver object 189 that creates three service objects 183A, 183B, and 183C for different types of media. Each service object 183A, 183B, and 183C has its own dedicated client object 179A, 179B, and 179C, respectively, for processing events with the corresponding media type. An example of this architecture is shown in FIG. 1D for inbound communication receiver 170 that includes client object 179A for handling fax media, client object 179B for handling email media, and client object 179C for handling phone media. Client objects 179A, 179B, and 179C correspond to fax service object 183A, email service object 183B, and phone service object 183C, respectively.

Figure 1I:
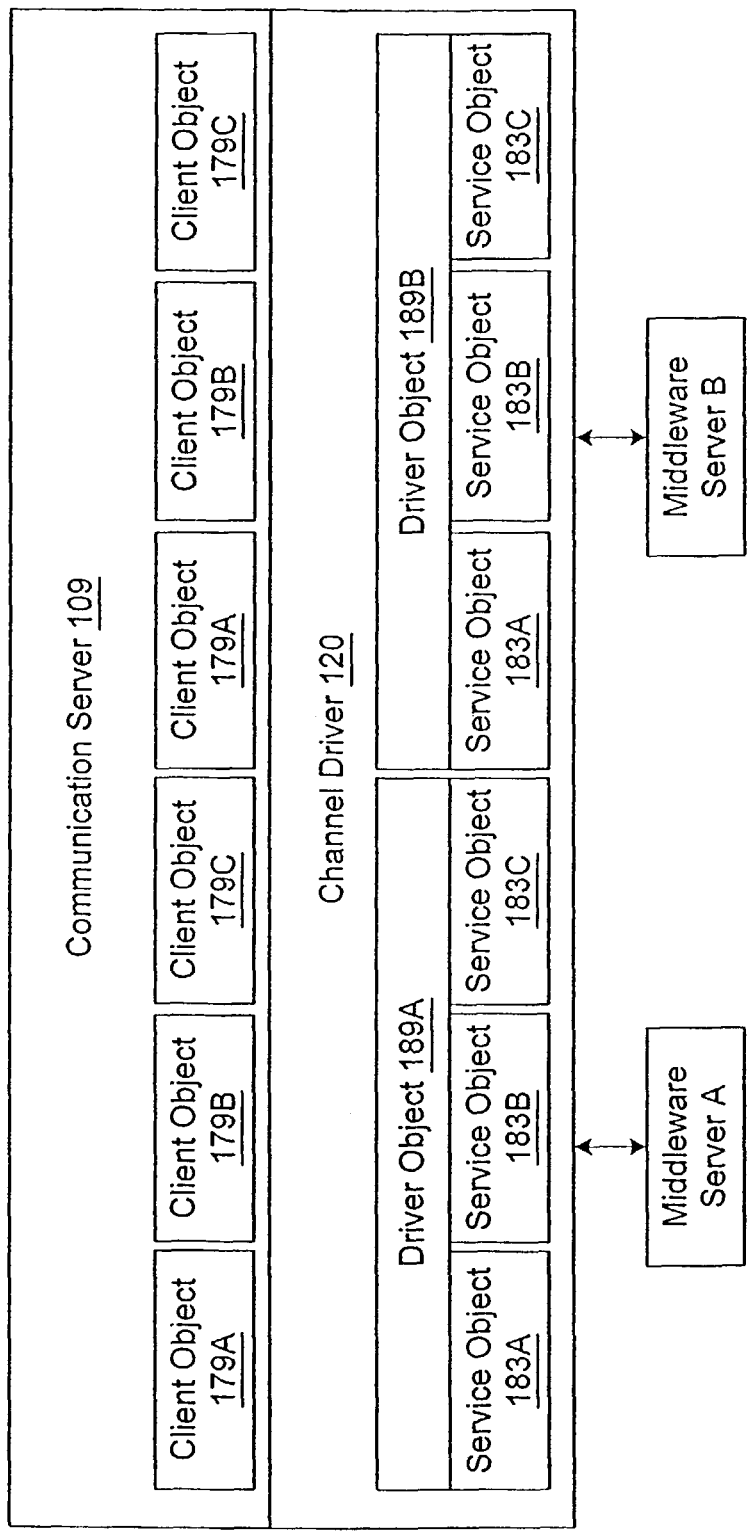
FIG. 1I is a diagram of components included in another implementation of a communication application programming interface.

FIG. 1I shows two driver objects 189A, 189B instantiated in the channel driver 120. Each driver object 189A, 189B is designated for a different middleware server and includes resources specific to the type of middleware server. For example, driver object 189A may use a TCP/IP connection to Middleware Server A and driver object 189B may have a direct connection to Middleware Server B. The service objects 183 created under each driver object 189A, 189B are specific to the middleware server with which the driver object 189A, 189B is associated.

There are several alternatives for implementing asynchronous notification of events from middleware servers to driver objects 189 including:

1. Traditional TCP/IP socket. The driver objects 189 connect to the TCP/IP port of a middleware server. Events are sent through TCP/IP connection.
2. OLE interface. One example is the IAdviseSink interface in OLE.
3. Any other inter-process communication scheme.

With alternative 1, since the driver objects 189 can be implemented as a DLL, the driver object DLL either constructs a listening thread which blocks on select( ) call until the arrival of an event, or a polling thread which periodically polls the middleware server for the arrival of an event. Polling threads are useful for low-priority media types, e.g. email or fax, because polling periods typically last seconds or minutes. Polling threads are not as useful to detect high-priority media events, such as phone requests, because it is desirable to report the arrival of an incoming call at any time. Listening threads generate less network traffic than polling threads, and are generally useful for high priority and low priority media, however, some types of middleware servers do not support listening threads.

To implement both polling threads and listening threads, a "task" thread is required in the driver object DLL. The "task" thread can be executed in driver objects 189 as shown in FIG. 1J or in service objects 183 as shown in FIG. 1K.

Figures 1J, 1K:
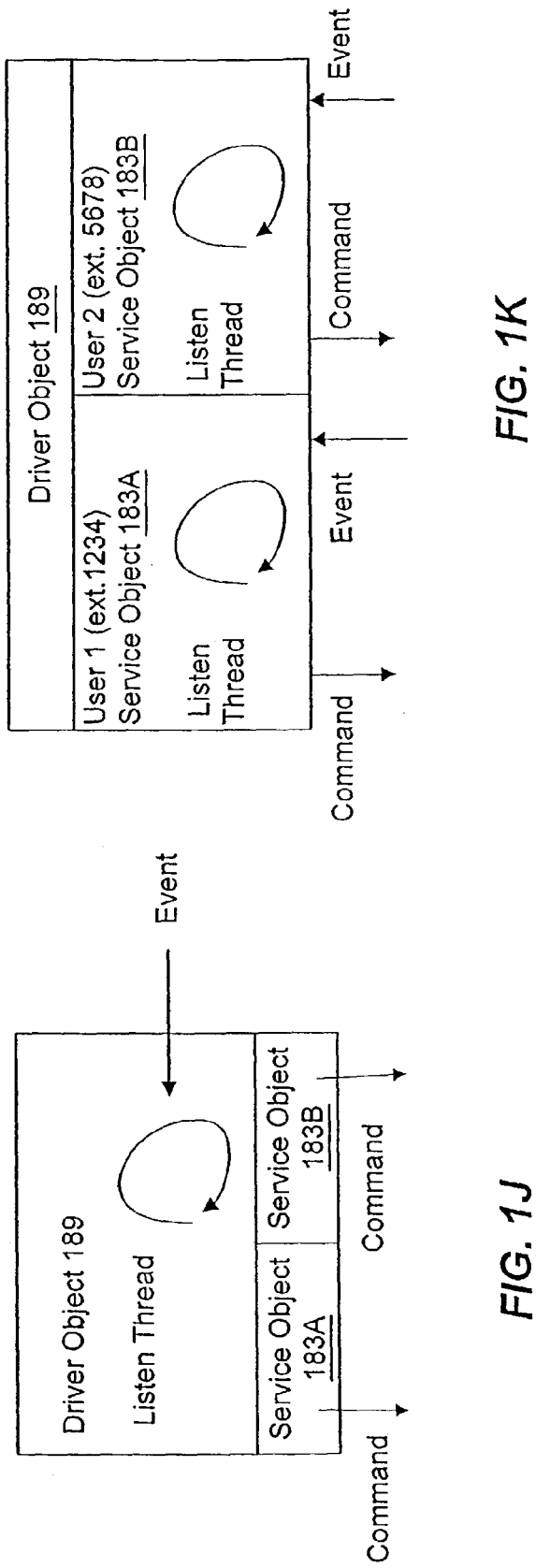
FIG. 1J is a diagram of components included in another implementation of a communication application programming interface.
FIG. 1K is a diagram of components included in another implementation of a communication application programming interface.

Referring to FIG. 1J, a task thread (or listen thread) implemented in the driver objects 189 may be "shared" by all service objects 183. For example, this listen thread can listen for all incoming events for all service objects 183. Once the listen thread receives an event, the listen thread then invokes and executes the event handling function implemented at service objects 183.

Referring to FIG. 1K, if the listen thread is implemented at the domain of service objects 183, every service object 183 constructs its own listen thread and the listen thread is not shared. Each listen thread listens to a different target. For example, listen thread for user 1 listens for events on the first phone extension (ext. 1234), while the listen thread for user 2 listens for events on the second phone extension (ext. 5678).

In one embodiment, client objects 179 are a collection of function pointers implemented by communication server 109 and passed to the service objects 183 for asynchronous event notification. In one implementation, when the listen thread in channel driver 120 receives an event, the following processes occur:

1. Service object 183 invokes the HandleEvent( ) function implemented in corresponding client object 179.
2. Client object 179 queues this event to a memory cache.
3. Client object 179 interrupts or signals the server thread 174 (FIG. 1D) for Communication channel manager 177 to indicate the arrival of an event. Once this process is completed, the listen thread waits for the next event.
4. During the next cycle of server thread 174, main thread sees an event is available in the memory cache. It dequeues the event out of the memory cache and continues the processing.

Communication API Commands

Communication API 125 includes commands and data structures to allow third parties to develop applications that can integrate with client/server system 100. The data structures include arrays for passing data elements such as an agent's key value element, key value parameters, and string parameter lists.

The following provide examples of runtime status flags that can be used in communication API 125:
NOTSUPPORTED=1; Command is not supported
DISABLED=2; Command is disabled at this time
CHECKED=4; Command is in "checked" state, for example when agent is in busy mode the "busy" command will be "checked"
BLINKING=8; This is special effect flag to enable the blinking "answer call" command
NOPARAMSOK=16; Command does not require any parameters to execute
STRPARAMSOK=32; Command can be executed by providing single unnamed string parameters. Such commands are invoked when the agent types something in the edit control of the communication toolbar 105 and clicks the corresponding button.

The following provide examples of commands that can be used in one embodiment of communication API 125:
MediaType: The MediaType command is used from channel driver 120 to provide the media type. An indicator of the media type, such as the following examples of media type strings, is passed to the channel driver 120 at the CreateISCDriverInstance( ) function:
PHONECONTROL=1
CALLROUTING=2
EMAIL=3
FAX=4
WEBCALL=5
WEBCHAT=6
CommandTypeEx: Channel driver 120 uses the CommandTypeEx function to request different services, such as making calls and sending messages, from communication server 109.
ObjectType: The ObjectType function is used to monitor the communication objects, which can be represented by the following parameter values:
OB_LINK=1
SWITCH=2
QUEUE=3
TELESET=4
DN=5
AGENT=6
CALL=7
CALLROUT=8
EMAIL=9
FAX=10
WEBCALL=11
WEBCHAT=12.
OTHERS=1000
ObjectProperty: The function ObjectProperty can be used to provide properties of monitored communication objects, such as:
ONOFF=1
AGENTID=2
NOTREADY=4
BUSY=5
DESCRIPTION=7
TIMEINQUEUE=9
QUEUEID=12
ISLOGON=13

Channel Driver Functions

In one embodiment, driver objects 189 within each of channel drivers 120 can include the following functions:
FreeSCStrParamList is invoked by communications server 109 to release the memory which is initially allocated by channel drivers 120.
RequestMediaTypeList is invoked by communications server 109 to query the list of media type strings supported by channel drivers 120. It can include the parameter mediaTypeList, which is a list of media-type strings.
FreeSCStrParamList is invoked by communication server 109 to release memory.
RequestCommandEventList is invoked to generate lists of commands and events that are implemented for a particular media type supported by the channel drivers 120. The parameters can include an input parameter specifying the media type, and output parameters that include lists of the commands and events.
CreateISCDriverInstance is invoked to create a channel driver 120. The following parameters can be used:
mediaTypeStr: the media-string that is defined by a particular driver implementation.
languageCode: the language string, e.g. "ENU" for English, "FRA" for French, "DEU" for German, "PTB" for Portuguese-Brazilian, "ESN" for Spanish, "ITA" for Italian, and "JPN" for Japanese.
connectString: the connect string for the channel driver 120
datasetParams: the parameter list collected from the configuration
handle: the handle to channel driver 120 returned by the channel driver 120
RequestService requests service object 183 from the channel driver 120. The following parameters can be used:
clntInterface: the interface at the client object 179
connectString: the connect string for the service object 183
datasetParams: the parameter list collected based on the configuration
serviceHandle: the handle to the service object 183 returned by the driver 120
ReleaseISCDriverInstance is invoked by communication server 109 to release the driver object 189 specified by the driver handle supplied as a parameter.

Service Object Functions

In one embodiment, service objects 183 within each of channel drivers 120 can include the following functions:
ReleaseISCServiceInstance is invoked to release the service object's handle.

NotifyEventHandlingFinished is invoked by communications server 109 to notify the driver object 189 that the event handling is complete and the driver object 189 can move on or continue the process. This function is invoked to respond to HandleEvent's notifyWhenDone parameter. The following parameters can be used:
  Handle: identifier of the service object 183.
  trackingID: an identifier for the work item for which the communications server 109 was doing event handling.
  result: the result of event handling query of the list of media type strings supported by the channel driver 120.
InvokeCommand is invoked by communications server 109 to invoke a driver command. The following parameter list can be used:
  Handle: identifier of the service object
  clntCmdTrackID: the unique ID for the InvokeCommand request name: the command name to invoke
  stringParam: the string from "Phone #" edit box on the toolbar 105
  datasetParam: the parameter list collected based on the configuration
InvokeCommandEx is invoked by communications server 109 to invoke a certain type of command. The following parameter list can be used:
  Handle: identifier of the service object.
  clntCmdTrackID: the unique ID decided by the communications server 109 for this InvokeCommand request.
  commandType: the type of command the communications server 109 wants to execute.
  datasetParam: the predefined parameter list set by the communications server 109.
ReleaseWorkItem is invoked by communication server 109 to request release of a work item. Parameters can include:
  Handle: identifier of the service object.
  TrackingID: identifier of the work item.
SuspendWorkItem is invoked by communication server 109 to request the service object 183 to suspend a work item. Parameters can include:
  Handle: identifier of the service object 183.
  TrackingID: identifier of the work item.
ResumeWorkItem is invoked by communication server 109 to request the service object 183 to resume a work item. Parameters can include:
  Handle: identifier of the service object 183.
  TrackingID: identifier of the work item.
HandleQueuedEvent is invoked by communication server 109 to pass an event previously queued in UQ system 102 to the service object 183 for handling. The channel driver 120 can treat this as an incoming media event from the middleware server. Parameters can include:
  Handle: identifier of the service object.
  name: the event name (from the original HandleEvent( ) call).
  fields: the event attributes list (from the original HandleEvent( ) call).
  trackingID: the unique ID for the media item.
CancelQueuedEvent is invoked by communication server 109 to notify the channel driver 120 that a media-event is cancelled, released, or transferred by UQ system 102. This function is the companion function of HandleQueuedEvent( ). The following parameters can be used:
  Handle: identifier of the service object.
  name: the event name (from the original HandleEvent( ) call).
  trackingID: the unique ID for the media item.

Client Object Functions

The following are examples of functions that can be included in Client Objects 179. The interface to these functions can be implemented with a function pointer so that driver objects 189 do not need to link to any libraries in communication server 109.

ReleaseClientInstance causes driver object 189 to release a client object's handle.

BeginBatch and Endbatch are designed to save network overhead. The client object functions called between BeginBatch and EndBatch can be cached and sent out at the EndBatch call. These two functions can be used at the discretion of the driver object 189. For example,

```
BeginBatch_Helper(clientInterface);
    CacheCommandInformation_Helper(clientInterface, ...); <-- cached
; ; ; ; // some processing
if (error)
    HandleError_Helper(clientInterface, ...); <-- cached
HandleEvent_Helper(clientInterface, ...); <-- cached
EndBatch_Helper(clientInterface); <-- All requests will be sent out in
    one request
*/
```

HandleEvent is used to handle the named event received from the channel driver 120, using the given fields. By calling this method, the channel driver 120 notifies the client objects 179 of the event, such as a call coming in on the monitored teleset. The following is the parameter list:
  Handle: identifier of the service object 183.
  name: the event name.
  fields: event attributes list.
  notifyWhenDone: When set to TRUE, client objects 179 will invoke notifyEventHandlingFinished( ) to notify the driver 120 as soon as the event handling is done.
  trackingID: the ID uniquely identifies the work item that this event is associated with, e.g. call ID, email ID or web-chat session ID.
ShowStatusText displays textual status information in the status line of the client objects 179. The following parameter list can be used:
  Handle: identifier of the service object 183.
  text: the text to display at the client status bar.
HandleError handles asynchronous errors and logs them to an error log file. The following parameters can be used:
  Handle: identifier of the service object 183.
    clntCmdTrackID: if not 0, it is the same "clntCmdTrackID" value passed to InvokeCommand( ) to reflect the error caused by the request in InvokeCommand( ). If it is 0, the error occurs out of context.
  error: the error text.
CacheCommandInformation is used to notify the client objects 179 about command status caching. The following parameters can be used:
  commandNames: list of command names.
  commandDescriptions: list of description text for each command.
  commandStatuses: list of status (CommandFlag) for each command.
UpdateObjectInformation is used to notify the client objects 179 about status change of objects. The following parameters can be used:

trackingID: the ID uniquely identify the call that causes this information update.

objectType: enumerated ObjectType value.

objectID: the unique ID for this object. For phone, it is the extension. For email, it is the mailbox. For fax, it is the fax number.

datasetInfo: the list of ObjectProperty values to update. For example, the list {{"4", "TRUE"}, {"9", "33"}} indicates ISNOTREADY is TRUE and TIMEIN-QUEUE is 33 seconds.

IndicateNewWorkItem notifies client objects 179 about the arrival of new inbound work item (e.g. call, email or fax) if the driver or the middleware supports a facility to change the work item's ID. The following parameters can be used:

trackingID: the unique ID to identify the new work item.

oldTrackingID: ID to identify the old ID.

WorkitemStarted notifies client objects 179 that the agent has started working on one particular work item. This happens when (1) the agent answers a call and the call is connected, or (2) the agent accepts an email/fax work item. In response, client object 179 sets the work item identified by "trackingID" as the active work item and starts tracking this work item. The agent will be treated as talking or working. The start time of this work item can be recorded by client objects 179. The following parameters can be used:

trackingID: the unique ID to identify this work item.

oldTrackingID: See the comment of the function IndicateNewWorkItem( ).

objectType: the object type.

objectID: the media object for this work item. For phone, it is the extension. For email, it is the mail box.

description: the description of work item. Driver implementation can use UpdateObjectInformation to change the description of work item.

startTime: the time the work item is started.

WorkItemReleased is used to notify client objects 179 that a particular work item is released. This happens when (1) the agent releases a call and the call is disconnected, or (2) the agent completes an email/fax work item. In response, client objects 179 stop tracking this work item and remove this work item. The following parameters can be used:

trackingID: the unique ID to identify the work item that is being released.

stopTime: the time the work item is released/stopped.

CleanAllWorkItems notifies client objects 179 that all work items stored in client objects 179 should be removed.

WorkItemSuspended notifies client objects 179 that a work item is suspended. This can happen, for example, when (1) the agent puts a call to hold, or (2) the agent suspends an email/fax work item. The driver implementation calls this function when suspension is done. In response, client objects 179 save the working context for this particular work item. The parameter trackingID can be used to identify the work item WorkItemResumed notifies client objects 179 that a suspended work item is resumed. This can happen, for example, when (1) the agent unholds a call and the call is retrieved, or (2) the agent resumes an email/fax work item. The driver objects 189 call this function when restoring is complete. In response, client objects 179 restore the working context(screen+work-tracking obj) and set the active work item as the one identified by "trackingID". The parameter trackingID can be used to identify the work item.

Note that other functions and parameters can be included in communication API 125 instead of, or in addition to, the functions listed herein.

Figure 3:
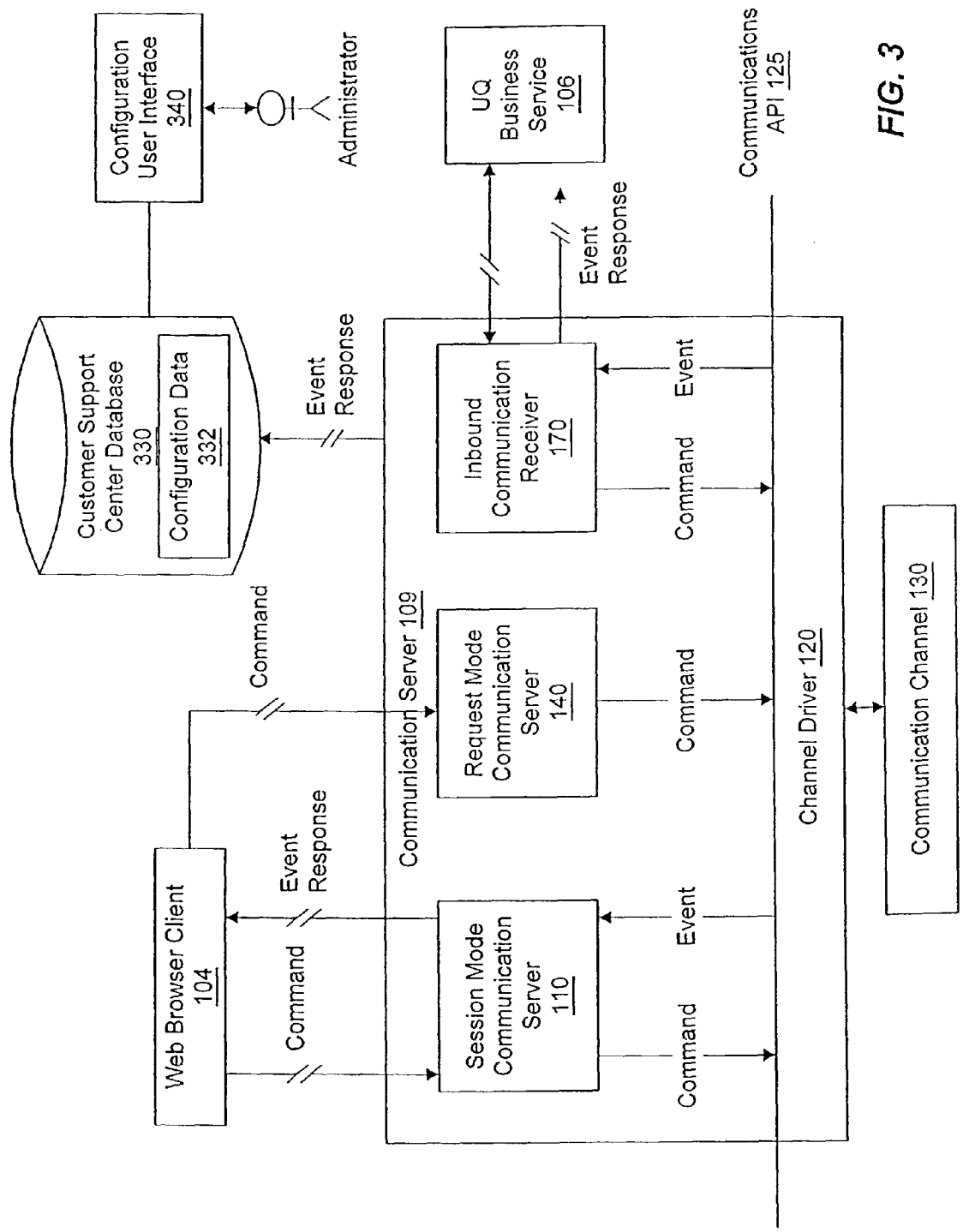
FIG. 3 is a block diagram showing the processing of commands and events by the system of FIGS. 1A through 1K.

FIG. 3 shows the processing of commands and events by communication server 109. As described above, session mode communication server 110 controls a user interface presented to an agent for handling work items, and session mode communication server 110 is shown in FIG. 3 interacting with web browser client 104. The user interface is consistent for communication using multiple communication channels of different media types. The following description of processing of events by session mode communication server 110 also applies to request mode communication server 140 and inbound communication receiver 170.

An agent logs in to client/server system 100 by activating a user interface object such as a login object of a user interface indicating that he or she is able to begin providing support for customer support requests. An agent can log in to any communication channel 130 associated with a customer support center configuration to which the agent is also associated. At login, web browser client 104A sends a connection command to session mode communication server 110 communicated through intermediate components (omitted here, as shown by the breaks in the arrows) of application server 126, as described in FIG. 1B.

The result of the connection command is that a session is established between toolbar 105 and session mode communication server 110. The session connection enables session mode communication server 110 to push information from communication channel 130 to toolbar 105. If the communication channel 130 is one that allows agents and customers to communicate interactively such as a live web collaboration session, channel driver 120 is responsible for maintaining the persistent connections within the communication channel 130.

Channel driver 120 is implemented according to communications API 125 to communicate with communications server 109. Communications API 125 requires a vendor providing channel driver 120 for a particular communication channel 130 to implement certain functions and data structures in order to communicate with communications server 109, as described above for FIGS. 1A-1K.

One requirement of communications API 125 is that channel driver 120 provide instructions to create a driver object and a service object for communicating with communication server 109. The driver object is specific to the media type of communication channel 130. The driver object creates service objects for communication channel 130, such as email service object 183B for email communication channel 130G and fax service object 183A for fax communication channel 130H of FIG. 1D.

Channel driver 120 monitors communication channel 130 for communication activity, as described above with reference to FIGS. 1J and 1K. In FIG. 1J, driver object 189 listens to communication channel 130, and in FIG. 1K, service objects 183A and 183B listen. Whether the listening is performed via a driver object 189 or a service object 183 is a decision made by the vendor in developing the channel driver 120.

The service objects 183 implement the functionality for communicating with one or more communication channel 130 such as the handshaking and protocol(s) to send commands to and receive events from the hardware devices and/or software elements of communication channel 130.

Upon agent login, session mode communication server 110 loads all channel drivers 120 for the configuration to which the agent using client 104 belongs. A listen thread of session mode communication server 110 then listens to web browser client 104A for commands and the channel driver objects 189 or server objects 183 listen for events from channel driver 120 indicating activity on communication channel 130.

When an agent activates a user interface object (such as by clicking on an accept work item button) on toolbar 105, an InvokeCommand function of the user interface object is activated that sends the name of a command to be issued to session mode communication server 110. Session mode communication server 110 determines a channel driver 120 to issue the command by using the command name received from the user interface object to query customer support center database 330. The command table CMD (FIG. 2r), the channel driver table CNCTR (FIG. 2a), and the configuration table CFG (FIG. 2n) are examples of tables that can be used by session mode communication server 110 to determine the channel driver 120 associated with the command. Session mode communication server 110 obtains the parameters necessary for the command from a command parameter table such as CMD_PARM (FIG. 2s) and uses the service objects 183 to provide the command and the parameters to channel driver 120. Channel driver 120 issues the command to the communication channel 130.

When an event from channel driver 120 is received, session mode communication server 110 determines the channel driver 120 for the communication channel 130 that originated the event by querying customer support center database 330. Tables such as channel driver table CNCTR (FIG. 2a), event table EVT (FIG. 2t), and configuration table CFG (FIG. 2n) are among the tables used to identify the channel driver 120.

Having identified channel driver 120 as responsible for originating the event, session mode communication server 110 determines an event response to be made. The event response may be in the form of a data window presented via web browser client 104 as directed by Java applet 116. Other types of event responses include presentation of a scripted dialogue of questions for the agent to ask the customer, running a software program to perform an operation, calling a business service of a server component of system 100 such as UQ business service 106, and creating a database record in customer support center database 330. An event response corresponds to an event. Event responses are configurable by an administrator using configuration user interface 340 and are stored in an event response table such as EVTRESP (FIG. 2y). Session mode communication server 110 also logs the event response for tracking purposes in an event log table such as EVT_LOG (FIG. 2aa).

Communications server 109 uses configuration data 332 from customer support center database 330 to control the presentation of information to the agent via the client. For instance, the appearance of the toolbar presented by the client is determined according to configuration data 332. The buttons that appear, the commands that are invoked when an agent clicks each button, and the response triggered by an incoming event are all specified as part of configuration data 332 by an administrator using configuration user interface 340.

Figure 4:
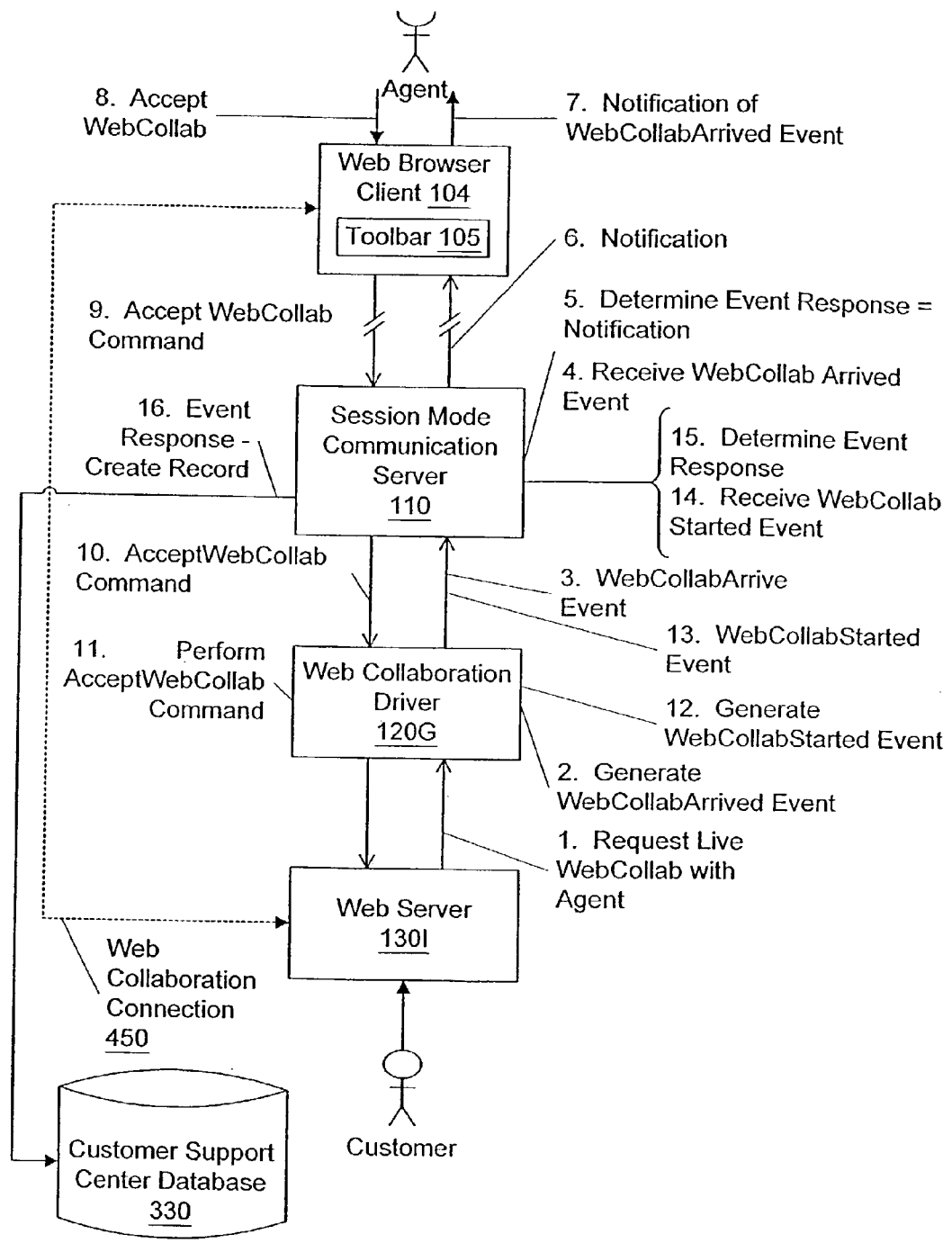
FIG. 4 is an example of the operation of components of the system of FIGS. 1A through 1K to establish a web collaboration session between a customer and an agent.

FIG. 4 shows an example of the operation of components of client/server system 100 to establish a web collaboration session between a customer and an agent. In step 1, a customer requests a live web collaboration session with an agent. Web collaboration driver 120G generates a WebCollabArrived event in step 2, and sends the WebCollabArrive event to session mode communication server 110, as shown in step 3.

In step 4, session mode communication receiver 110 receives the WebCollab Arrived Event and, in step 5, determines an appropriate event response. To determine the event response, the originating channel driver for the event is determined as described above by querying customer support center database 330 (query not shown). In this case, the event response is to perform a notification function, as shown in step 6, to provide a notification to the agent via web browser client 104, as shown in step 7. An example of a notification is to cause a button on toolbar 105 to blink and/or to provide a data window with information about the customer and the web collaboration request.

In step 8, the agent accepts the web collaboration request by activating a user interface object such as a work item object of toolbar 105, such as clicking on an accept work item button. The work item object is associated with a command, here an AcceptWebCollab command, that is sent in step 9 to session mode communication server 110. Session mode communication server 110 sends the AcceptWebCollab command to web collaboration driver 120G as shown in step 10, which performs the AcceptWebCollab command as shown in step 11. In this case, web collaboration driver 120G dynamically establishes web collaboration connection 450 between web server 130I and web browser client 104.

In step 12, web collaboration driver 120G generates a WebCollabStarted event and sends the WebCollabStarted event to session mode communication server 110 in step 13. In step 14, session mode communication server 110 receives the WebCollabStarted event and determines the appropriate event response in step 15. In this case, the event response, as shown in step 16, is to create a record and store it in customer support center database 330. When the web collaboration session is completed, web collaboration driver 120G will generate the appropriate events and send them to session mode communication server 110, which will determine an appropriate event response and perform the event response.

Figure 5:
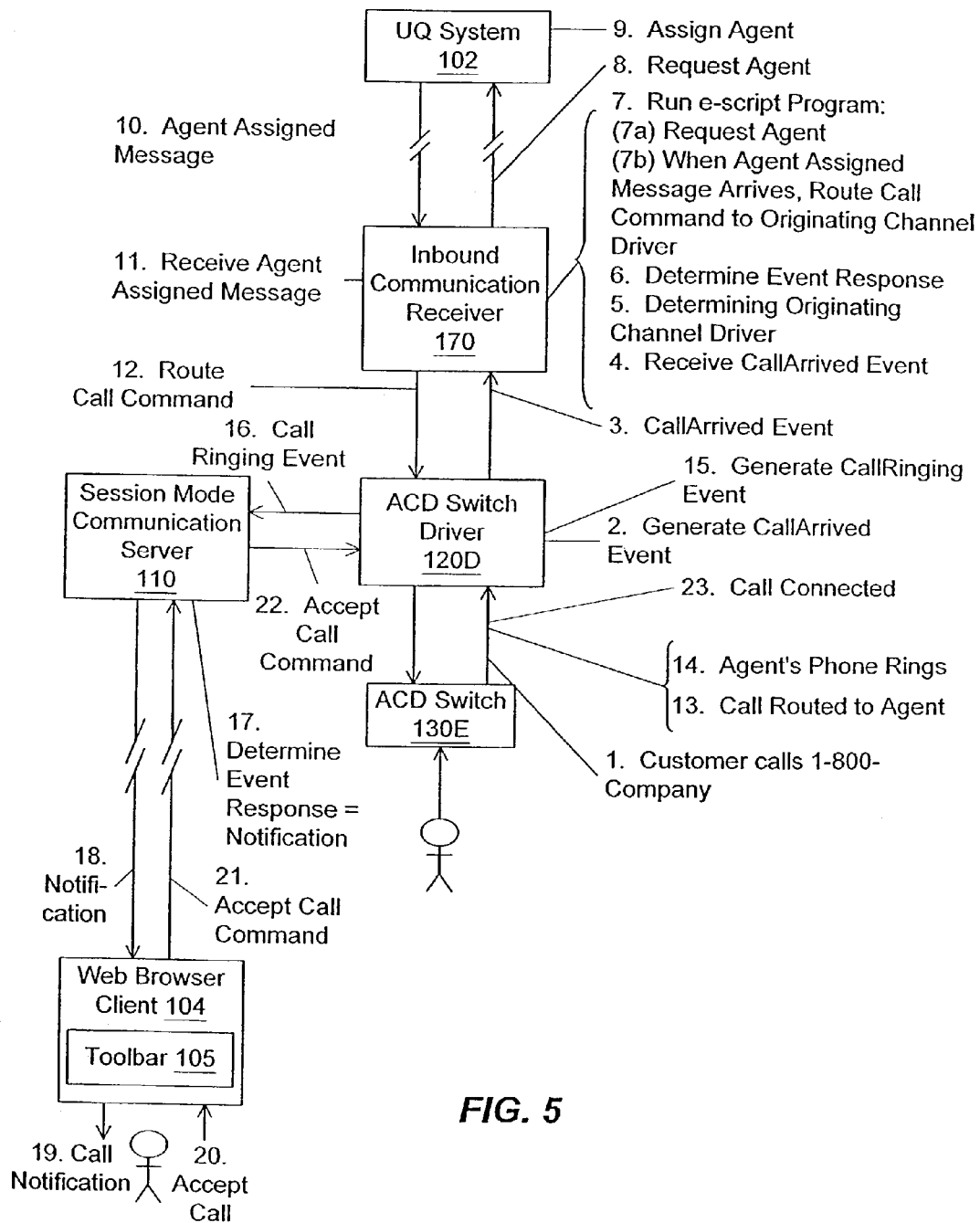
FIG. 5 is an example of the operation of components of the system of FIGS. 1A through 1K using the universal queuing system component to assign an agent to an incoming telephone call, notifying the assigned agent via the user interface, and routing the telephone call to the assigned agent.

FIG. 5 shows an example of the operation of components of client/server system 100 using the universal queuing system of FIG. 1 to assign an agent to an incoming telephone call and route the telephone call to the assigned agent. In step 1, the customer calls 1-800-company to submit a customer support request. When the call arrives, ACD switch driver 120D detects the incoming telephone call and generates a CallArrived event. While ACD switch 130E is capable of automatically routing the call, in this example inbound communication receiver 170 is configured to allow an automated assignment of agents rather than using the hardware capabilities of the ACD switch driver 130E to route the call.

Inbound communication receiver 170 monitors particular phone numbers including 1-800-company. When inbound communication receiver 170 receives the CallArrived event in step 4, inbound communication receiver 170 determines the originating channel driver 120D as shown in step 5 and determines the event response in step 6. In this case, the event response is to run an e-script, as shown in step 7. In this example, the e-script requests an agent assignment in step 7a, and when the agent assigned message arrives, sends a transfer call command to the originating channel driver 7b. In step 8, the request agent assignment is submitted to UQ system 102 and UQ system 102 assigns an agent in step 9. In step 10, UQ system 102 sends an agent assigned message to inbound communication receiver 170, as described above. Note that several components of system 100 between inbound communication receiver 170 and UQ system 102 are omitted from the figure, as shown in the breaks in the lines of the arrows between the two components.

Inbound communication receiver 170 receives the agent assigned message in step 11, and, following step 7b of the e-script, sends a transfer call command to ACD switch driver 120D. ACD switch driver 120D performs the TransferCall command and transfers the call to the agent in step 13. In step 14, the agent's phone rings. In step 15, ACD switch driver 120D detects that the agent's telephone handset is ringing and generates a CallRinging event. ACD switch driver 120D sends the CallRinging event to session mode communication server 1101 in step 16, which handles notification of the agent of an incoming telephone call.

In step 17, session mode communication server 110 determines an appropriate event response, here to perform a notification function, and in step 18 sends a notification to toolbar 105. In step 19, toolbar 105 notifies the agent of the incoming call, and in step 20, the agent accepts the call by activating an accept work item object. In step 21, an AcceptCall command is sent to session mode communication server 110, which sends the AcceptCall command to ACD switch driver 120D, as shown in step 22. In step 23, ACD switch driver 120D performs the AcceptCall command to connect the customer placing the call with the assigned agent. ACD switch driver 120D will continue to generate events and session mode communication server 110 will continue to perform event responses as long as agents are logged in.

If the agent does not click an accept work item object on toolbar 105, but instead picks up the handset, no AcceptCall command is generated. Instead, ACD switch driver 120D detects that a call has been connected by listening to ACD switch 130E. In such a case, ACD switch driver 120D would generate a CallConnected event and session mode communication server 110 would perform the appropriate event response.

Figure 6:
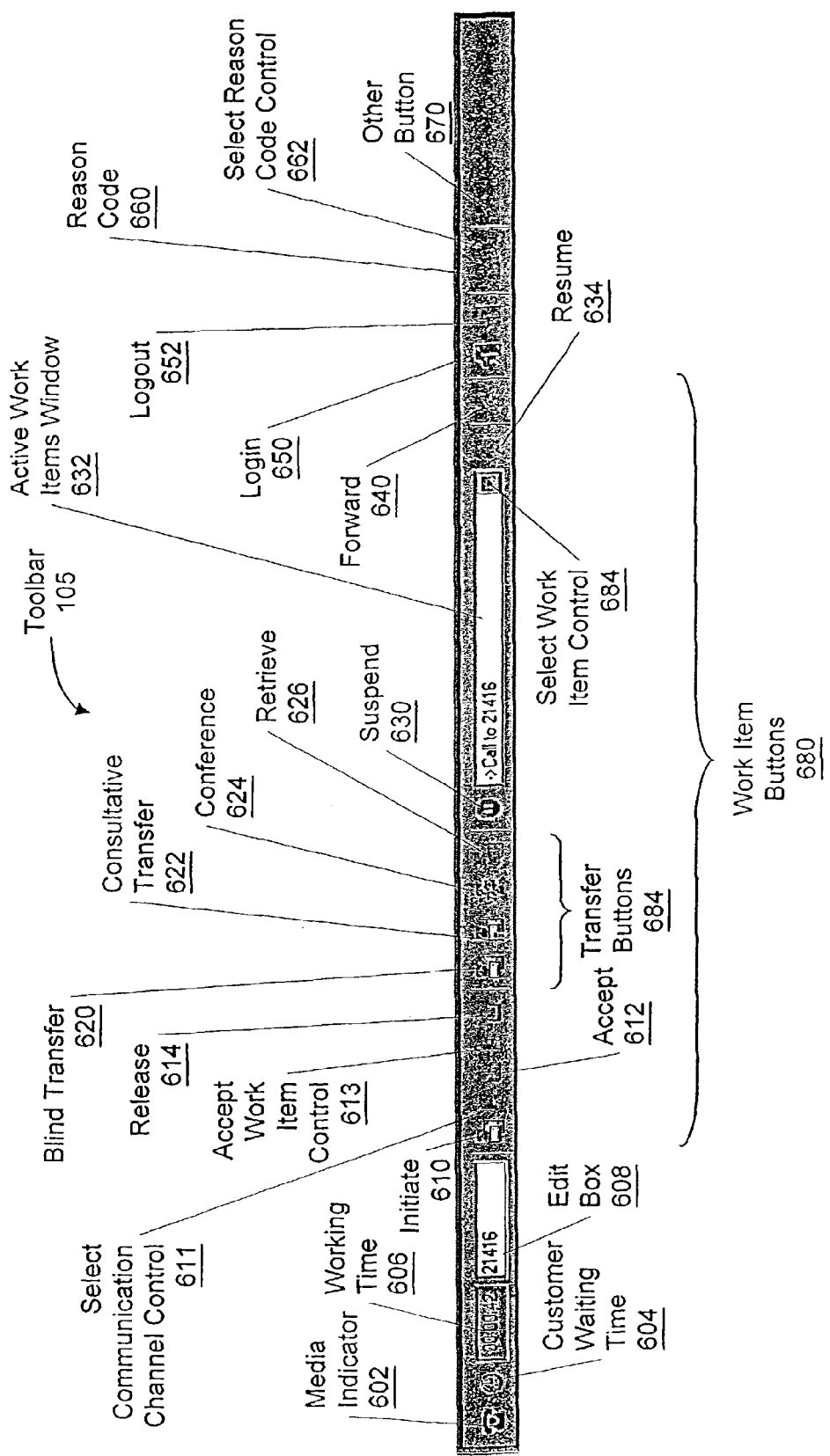
FIG. 6 is an example of an embodiment of the toolbar of the present invention.

FIG. 6 is an example of an embodiment of toolbar 105. Because toolbar 105 provides a single user interface for the agent to communicate using multiple communication channels of different media types, this embodiment of toolbar 105 includes a media indicator button 602 to show the media type of the currently active work item. Customer waiting time button 604 shows the amount of time that the customer has been waiting to receive a response to his or her customer support request associated with the work item. This information allows the agent to be responsive to the customer, for example, by apologizing when the customer has been waiting for a long time on hold on the telephone. Working time window 606 shows the amount of time the agent has spent working on the currently active work item. Edit box 608 allows the user to enter a small command, such as an extension number for dialing the telephone or a short message to be sent via short messaging service.

Work item buttons 680 includes buttons for enabling the agent to manage all of his or her active work items for all media types and communication channels.

Initiate work item button 610 enables the agent to initiate a work item. Select communication channel control 611 enables the user to select a media type for initiating a work item request. For example, the user of toolbar 105 can choose to use media types such as the telephone, email, fax, or paging. Media types available to the user are determined by session mode communication server 10 by accessing customer support center database 330 to obtain the customer support center configuration to which the agent belongs from table AGENT_CFG (FIG. 2p) and the agent limitation table AGENT_LIM (FIG. 2m) to eliminate the media types of the communication channels for which the agent cannot access.

The icon shown on initiate button 610 includes symbols representing multiple media types of telephone, email, and paging. The icon is used to show that the initiate work item is an abstract icon representing a work item for any media type. If the agent clicks on the initiate button 610 when displaying the abstract icon, toolbar 105 will determine from the context of the toolbar what the agent is trying to do. For instance, if the user is currently on the telephone with a customer, media indicator button 602 will show a telephone. If the agent simultaneously is viewing an email address for a contact and the user clicks on the initiate work item button, toolbar 105 will determine that, because the agent is already on the telephone and the contact has an email address, the agent must be trying to send an email to the contact. Toolbar 105 can be configured so that the new email screen is loaded with the customer information in order to save the agent time in typing the email. Toolbar 105 is configurable by an administrator using a configuration user interface 340.

Sources of context for controlling toolbar 105 include the content of the database record(s) currently being presented by toolbar 105, the content of edit box 608 or other data entered by the agent, and the toolbar 105 user interface object or data currently selected by the agent. For example, if the agent types a string including an @ sign in edit box 608, toolbar 105 can be configured to predict that the agent is trying to send an e-mail and provide a window for entering email data.

The context-sensitivity of toolbar 105 is also configurable by an administrator by defining methods to be executed when an user interface object on toolbar 105 is activated using a configuration user interface 340. Therefore, context can also be based on company needs because the company can configure the toolbar 105 to operate using data-dependent criteria, for example, depending upon the volume of customer support requests being received. Toolbar 105 has the capability to traverse the commands associated with each button contained within to determine a command that applies to the agent's current context.

Accept work item button 612 allows the user to accept an incoming work item. Notification of an incoming work item is provided by toolbar 105 using a notification function. For example, the notification function can cause a button on toolbar 105 to blink when the agent has an incoming work item. When the agent accepts a work item, a command is sent by web browser client 104A to communication channel 130, which responds to the command by performing the command.

Accept work item control 613 enables the agent to select from a list of incoming work items. Release work item button 614 is used to release an active work item. Session mode communication server 110 can be configured to release the telephone call work item automatically when the agent hangs up the telephone handset without clicking the release work item button 614. The hardware controlling the telephone connection sends a disconnect signal to the telephone switch to disconnect the agent's and customer's telephone lines.

For client/server system 100, and particularly UQ system 102, to be aware that the telephone work item has been released, session mode communication server 110 must be aware of the physical disconnection. Channel driver 120 associated with the communication channel including the telephone switch is listening to the communication channel 130 and detects the physical disconnection of the telephone lines. In response, channel driver 120 sends a "line disconnected" event to session mode communication server 119. Session mode communication server 110 performs the appropriate event response and notifies UQ system 102 that the work item has been released.

Transfer buttons 684 are related to transferring work items such as telephone calls. Blind transfer button 620 enables the agent to transfer a telephone call to another extension and hang up without confirming whether an agent at the extension accepted the telephone call. If the telephone call is not accepted by another agent, the session mode communication server 110 can be configured to send the telephone call as a work item to UQ system 102 for placement into a queue of work items. The telephone call is removed from the transferring agent's list of active work items.

Consultative transfer button 622 enables an agent to consult with an agent at another extension before the call is transferred and to keep the telephone call if the other agent does not answer. Conference button 624 enables the agent to connect more than two telephone lines together for a joint telephone conversation. Retrieve button 626 enables the agent to retrieve a telephone call that the agent has transferred.

Suspend button 630 enables an agent to suspend a work item; for example, put a telephone call on hold or suspend writing an email response, to work on another work item or take a break. Active work items window 632 enables the agent to see the currently active work item. Select work item control 684 enables the agent to select a work item from the list of work items currently assigned to the agent. Resume button 634 allows the agent to resume work on a work item selected from the list of work items.

Forward button 640 applies to media types such as telephones and email. All telephone calls to a particular telephone number can be automatically forwarded to another telephone number when, for example, an agent is away from his usual work location. In the context of media types such as email, forward button command 640 can be configured to operate as a forward command, retaining a copy of the original email or as "transfer" of the email removing the email from the agent's inbox and from the agent's list of active work items. Toolbar 105 can be configured to issue a command to notify UQ system 102 accordingly.

Login button 650 allows the agent to login to client/server system 100 to work on work items. A persistent connection is established between web browser client 104A used by the agent and each communication channel 130 that the agent is authorized to use.

Logout button 652 allows the agent to logout from client/server system 100.

Because client/system 100 is designed to monitor and provide real time information to agents, the agent needs a means of communicating his or her availability to accept work items from client/system 100. Reason code button 620 allows the agent to toggle between ready and not ready states for each media type. Select reason code control 662 allows the user to select from a list of reason codes when the agent is not ready to accept work items. Reason codes can be used by managers of the customer support center to monitor the efficiency of agents in providing customer support.

Other button 670 is provided to allow a company to provide other functionality via toolbar 105. Because the operation of each button of toolbar 105 is configurable by the company by associating the user interface object with a command using the configuration user interface 340, toolbar 105 provides maximum flexibility in providing its customer support center with a tool for communicating via multiple communication channels of different media types.

An example of commands implemented by a channel driver 120 for an email/fax server is provided in Table 1 below.

TABLE 1

| | |
|---|---|
| AcceptEmailFax | For agent to accept the incoming email or fax item. When this device command is invoked, the original media event received at the background-mode Communication Server will be dispatched to Communication Media Manager. |
| ReleaseEmailFax | For agent to release the active email or fax work item. Then the driver uses SRM to notify UQ server that the agent is read for the next work item. |
| TransferEmailFax | For agent to transfer the current email or fax item to another agent. This will be implemented using SRM API. |
| NotReadyForEmailFax | Set agent to not ready state in UQ system for email or fax. The implementation is the same as "ReleaseEmailFax" using SRM. |
| AcceptWorkCollab | For agent to accept the incoming web collaboration. When this device command is invoked, the original media event received at the background-mode Communication Server will be dispatched to Communication Media Manager. |
| ReleaseWorkCollab | For agent to release the incoming web collaboration. Same implementation as "ReleaseEmailFax". |
| TransferWebCollab | For agent to transfer the current web collaboration session to another agent. (This device command is still open and subject to change) |
| NotReadyForWebCollab | Set agent to not ready state in UQ system for web collaboration. Same implementation as "NotReadyForEmailFax". |

An example of events provided by a channel driver 120 for an email/fax server is provided in Table 2 below.

TABLE 2

| | |
|---|---|
| EventEmailFaxArrive | Report the arrival of new email or fax |
| EventEmailFaxConnected | Report the agent has accepted the new email or new fax |
| EventEmailFaxReleased | Report the agent has released the email of the fax |
| EventWebCollabArrive | Report the arrival of new web collaboration |
| EventWebCollabConnected | Report the agent has accepted the new web collaboration |
| EventWebCollabRelease | Report the agent has released web collaboration |
| EventAgentReady | Report the agent is ready for a particular media type |
| EventAgentNotReady | Report the agent is not ready for a particular media type |

The user interface as described herein provides many advantages, such as enabling an agent to receiving incoming and send outgoing communication via multiple communication channels of different media types. Customer support requests are received and presented to an agent, along with information providing context about the customer and the nature of the support request, are provided to the user in real time as the customer support request arrives. The agent uses this information to determine whether to accept the work item. The user interface also allows the agent to manage active work items. For example, the agent can initially accept a work item, and then if the agent finds that a work item should be handled by another agent, transfer the work item to the other agent or place the work item in a queue to be assigned to an expert in a particular area. The user interface provides the agent with tools for tracking the efficiency and progress in responding to customer support requests.

Other Embodiments

The present invention has been described in the context of software applications running on one or more computer systems. However, those skilled in the art will appreciate that the present invention is capable of being distributed as a program product in a variety of forms, and that the present invention applies equally regardless of the particular type of signal bearing media used to actually carry out the distribution. Examples of signal bearing media include: recordable media such as floppy disks and CD-ROM and transmission media such as digital and analog communication links, as well as media storage and distribution systems developed in the future.

Additionally, the foregoing detailed description has set forth various embodiments of the present invention via the use of block diagrams, flowcharts, and examples. It will be understood by those within the art that each block diagram component, flowchart step, operation and/or element illustrated by the use of examples can be implemented, individually and/or collectively, by a wide range of hardware, software, firmware, or any combination thereof. In one embodiment, the present invention may be implemented via Application Specific Integrated Circuits (ASICs). However, those skilled in the art will recognize that the embodiments disclosed herein, in whole or in part, can be equivalently implemented in standard integrated circuits, as a computer program running on a computer, as firmware, or as virtually any combination thereof. Designing the circuitry and/or writing the programming code for the software or firmware would be well within the skill of one of ordinary skill in the art in light of this disclosure.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are exemplary only, and are not exhaustive of the scope of the invention. Consequently, the invention is intended to be limited only by the spirit and scope of the appended claims, giving full cognizance to equivalents in all respects.

What is claimed is:

1. A method comprising:
   establishing a communication connection, the communication connection comprising:
      a communication channel,
      a channel driver, and
      a communication server, wherein
         the communication server is configured to communicate with a plurality of communication channels of different media types,
         the plurality of communication channels comprises the communication channel,
         the communication server is configured to communicate with the plurality of communication channels, without regard to the media type of each of the plurality of communication channels, by virtue of the communication server being configured to communicate with the plurality of communication channels via a plurality of channel drivers,
         the plurality of channel drivers comprises the channel driver,
         the plurality of channel drivers are external to the communication server,
         the communication server and the plurality of channel drivers are configured to communicate with one another according to a communications application program interface (API),
         the communications API allows communications occurring between the communication server and the plurality of channel drivers to be media-independent,
         the communication server is configured to establish a session between the communication server and a web browser presenting a user interface, and
         the communication server is configured to control the user interface during the session by pushing information to the web browser;
   creating the user interface, wherein
      the user interface is configured to present work items from the plurality of communication channels to an agent;
   determining that the communication connection has switched from a first state to a second state in response to an event;
   establishing a persistent connection between the user interface and a web server, wherein
      the persistent connection is established in response to the communication server receiving a connection request from the agent, and
      the web server is coupled to the communication server;
   causing the communication server to asynchronously push information to the user interface via the persistent connection, wherein
      the information indicates that the communication connection has switched from the first state to the second state; and
   causing the user interface to be asynchronously updated to indicate that the communication connection has switched from the first state to the second state.

2. The method of claim 1, wherein
   the first state is one of active and inactive,
   the second state is active when the first state is inactive, and
   the second state is inactive when the first state is active.

3. The method of claim 1, wherein the causing the user interface to be asynchronously updated comprises:
   causing the user interface to indicate that the communication connection is inactive when the second state is inactive.

4. The method of claim 1, further comprising:
   allowing initiation of communication via the communication connection when the second state is inactive.

5. The method of claim 1, wherein the causing the user interface to be asynchronously updated comprises:
   causing the user interface to indicate that the communication connection is active when the second state is active.

6. The method of claim 1, further comprising:
   disallowing initiation of communication via the communication connection when the second state is active.

7. The method of claim 1, wherein
   at least two of the plurality of communication channels are of different media types, and
   the user interface communicates independently of each media type.

8. The method of claim 1, wherein
   the determining and the causing the user interface to be asynchronously updated are performed by the communication server.

9. The method of claim 1, wherein the causing the user interface to be asynchronously updated comprises:
   sending an asynchronous message to the user interface.

10. The method of claim 9, wherein
the asynchronous message triggers updating the user interface.

11. The method of claim 1, wherein
the channel driver instantiates a driver object,
the driver object instantiates a service object,
the driver object is specific to a media type of the communication channel,
the driver object detects the event,
the event is received from a customer via the communication channel,
the service object initiates a response to the event,
the response to the event is initiated by sending the event to a client object corresponding to the service object, and
the response is implemented by the client object.

12. The method of claim 1, wherein
each channel driver of the plurality of channel drivers is configured to maintain information regarding a media type of a corresponding communication channel of the plurality of communication channels, and
the each of the plurality of channel drivers communicatively couples the communication server and the corresponding communication channel.

13. The method of claim 1, wherein
the communication server is configured to communicate with a single queuing system, and
the single queuing system is configured to process the work items from the plurality of communication channels.

14. A system comprising:
processing means for processing information, the processing means comprising
establishing means for establishing a communication connection, the communication connection comprising
a communication channel,
a channel driver, and
a communication server, wherein
the communication server is configured to communicate with a plurality of communication channels of different media types,
the plurality of communication channels comprises the communication channel,
the communication server is configured to communicate with the plurality of communication channels, without regard to the media type of each of the plurality of communication channels, by virtue of the communication server being configured to communicate with the plurality of communication channels via a plurality of channel drivers,
the plurality of channel drivers comprises the channel driver,
the plurality of channel drivers are external to the communication server,
the communication server and the plurality of channel drivers are configured to communicate with one another according to a communications application program interface (API),
the communications API allows communications occurring between the communication server and the plurality of channel drivers to be media-independent,
the communication server is configured to establish a session between the communication server and a web browser presenting a user interface, and
the communication server is configured to control the user interface during the session by pushing information to the web browser,
creating means for creating the user interface, wherein
the user interface is configured to present work items from the plurality of communication channels to an agent,
determining means for determining that the communication connection has switched from a first state to a second state in response to an event,
second establishing means for establishing a persistent connection between the user interface and a web server, wherein
the persistent connection is established in response to the communication server receiving a connection request from the agent, and
the web server is configured to be coupled to the communication server,
pushing means for causing the communication server to asynchronously push information to the user interface via the persistent connection, wherein
the information indicates that the communication connection has switched from the first state to the second state, and
causing means for causing the user interface to be asynchronously updated to indicate that the communication connection has switched from the first state to the second state; and
memory means for storing, wherein
the memory means and the processing means are coupled to one another, and
the memory means is configured to store at least one of information regarding the first state and information regarding the second state.

15. The system of claim 14, wherein
the first state is one of active and inactive,
the second state is active when the first state is inactive, and
the second state is inactive when the first state is active.

16. The system of claim 14, wherein the causing means comprise:
second causing means for causing the user interface to indicate that the communication connection is inactive when the second state is inactive.

17. The system of claim 14, further comprising:
allowing means for allowing initiation of communication via the communication connection when the second state is inactive.

18. The system of claim 14, wherein the causing means comprise:
second causing means for causing the user interface to indicate that the communication connection is active when the second state is active.

19. The system of claim 14, further comprising:
disallowing means for disallowing initiation of communication via the communication connection when the second state is active.

20. A system comprising:
an establishing module configured to establish a communication connection, the communication connection comprising
a communication channel,
a channel driver, and
a communication server, wherein
the communication server is configured to communicate with a plurality of communication channels of different media types, the plurality of communication channels comprises the communication channel, the communication server is configured to communicate with the plurality of communication channels, without regard to the media type of each of the plurality of communication channels, by virtue of the communication server being configured to communicate with the plurality of communication channels via a plurality of channel drivers, the plurality of channel drivers comprises the channel driver, the plurality of channel drivers are external to the communication server, the communication server and the plurality of channel drivers are configured to communicate with one another according to a communications application program interface (API), the communications API allows communications occurring between the communication server and the plurality of channel drivers to be media-independent, the communication server is configured to establish a session between the communication server and a web browser presenting a user interface, and the communication server is configured to control the user interface during the session by pushing information to the web browser;

a creating module for creating the user interface, wherein the user interface is configured to present work items from the plurality of communication channels to an agent;

a determining module for determining that the communication connection has switched from a first state to a second state in response to an event;

a second establishing module configured to establish a persistent connection between the user interface and a web server, wherein the persistent connection is established in response to the communication server receiving a connection request from the agent, and the web server is configured to communicate with the communication server;

a pushing module configured to cause the communication server to asynchronously push information to the user interface via the persistent connection, wherein the information indicates that the communication connection has switched from the first state to the second state;

a causing module configured to cause the user interface to be asynchronously updated to indicate that the communication connection has switched from the first state to the second state;

a processor, wherein the processor is configured to execute at least one of the establishing module, the creating module, the determining module, the second establishing module, the pushing module, and the causing module; and a memory, wherein the memory and the processor are coupled to one another, and the memory is configured to store the at least one of the establishing module, the creating module, the determining module, the second establishing module, the pushing module, and the causing module.

21. The system of claim 20, wherein
the first state is one of active and inactive,
the second state is active when the first state is inactive, and
the second state is inactive when the first state is active.

22. The system of claim 20, wherein the causing module comprises:
a second causing module configured to cause the user interface to indicate that the communication connection is inactive when the second state is inactive.

23. The system of claim 20, further comprising:
an allowing module configured to allow initiation of communication via the communication connection when the second state is inactive.

24. The system of claim 20, wherein the causing module comprises:
a second causing module configured to cause the user interface to indicate that the communication connection is active when the second state is active.

25. The system of claim 20, further comprising:
a disallowing module configured to disallow initiation of communication via the communication connection when the second state is active.

26. A computer program product comprising:
a plurality of instructions, comprising
establishing instructions configured to establish that a communication connection has been established, the communication connection comprising
a communication channel,
a channel driver, and
a communication server, wherein
the communication server is configured to communicate with a plurality of communication channels of different media types,
the plurality of communication channels comprises the communication channel,
the communication server is configured to communicate with the plurality of communication channels, without regard to the media type of each of the plurality of communication channels, by virtue of the communication server being configured to communicate with the plurality of communication channels via a plurality of channel drivers,
the plurality of channel drivers comprises the channel driver,
the plurality of channel drivers are external to the communication server,
the communication server and the plurality of channel drivers are configured to communicate with one another according to a communications application program interface (API),
the communications API allows communications occurring between the communication server and the plurality of channel drivers to be media-independent,
the communication server is configured to establish a session between the communication server and a web browser presenting a user interface, and
the communication server is configured to control the user interface during the session by pushing information to the web browser,
creating instructions configured to create the user interface, wherein
the user interface is configured to present work items from the plurality of communication channels to an agent, determining instructions configured to determine that
the communication connection has switched from a
first state to a second state in response to an event,
second establishing instructions configured to establish
a persistent connection between the user interface and
a web server, wherein
the persistent connection is established in response to
the communication server receiving a connection
request from the agent, and
the web server is configured to communicate with the
communication server,
pushing instructions configured to cause the communication server to asynchronously push information to
the user interface via the persistent connection,
wherein
the information indicates that the communication
connection has switched from the first state to the
second state, and
causing instructions configured to cause the user interface to be asynchronously updated to indicate
whether the communication connection has switched
from the first state to the second state; and
a non-transitory computer-readable storage medium,
wherein said plurality of instructions are encoded in said
non-transitory computer-readable storage medium.

27. The computer program product of claim 26, wherein
the first state is one of active and inactive,
the second state is active when the first state is inactive, and
the second state is inactive when the first state is active.

28. The computer program product of claim 26, wherein
the causing instructions comprise:
second causing instructions configured to cause the user
interface to indicate that the communication connection
is inactive when the second state is inactive.

29. The computer program product of claim 26, wherein
said plurality of instructions further comprise:
allowing instructions configured to allow initiation of communication via the communication connection when the
second state is inactive.

30. The computer program product of claim 26, wherein
the causing instructions comprise:
second causing instructions configured to cause the user
interface to indicate that the communication connection
is active when the second state is active.

31. The computer program product of claim 26, wherein
said plurality of instructions further comprise:
disallowing instructions configured to disallow initiation
of communication via the communication connection
when the second state is active.

32. The computer program product of claim 26, wherein
the channel driver instantiates a driver object,
the driver object instantiates a service object,
the driver object is specific to a media type of the communication channel,
the driver object detects the event,
the event is received from a customer via the communication channel,
the service object initiates a response to the event,
the response to the event is initiated by sending the event to
a client object corresponding to the service object, and
the response is implemented by the client object.

33. A computer system comprising:
a processor for executing instructions; and
a memory for storing the instructions, wherein the instructions comprise:
determining instructions configured to determine that a
first connection has switched from a first state to a second state, wherein
the first connection comprises
a communication channel,
a channel driver and
a communications server, wherein
the communication server is configured to communicate with a plurality of communication channels of different media types,
the plurality of communication channels comprises
the communication channel,
the communication server is configured to communicate with the plurality of communication channels, without regard to the media type of each of
the plurality of communication channels, by virtue of the communication server being configured to communicate with the plurality of communication channels via a plurality of channel
drivers,
the plurality of channel drivers comprises the channel driver,
the plurality of channel drivers are external to the
communication server,
the communication server and the plurality of
channel drivers are configured to communicate
with one another according to a communications
application program interface (API),
the communications API allows communications
occurring between the communication server
and the plurality of channel drivers to be media-independent,
the communication server is configured to establish
a session between the communication server and
a web browser presenting a user interface,
the communication server is configured to control
the user interface during the session by pushing
information to the web browser, and
the switch is in response to an event,
creating instructions configured to create the user interface,
wherein
the user interface is configured to present work items
from the plurality of communication channels to an
agent,
establishing instructions configured to establish a persistent connection between
the user interface and a web server, wherein
the persistent connection is established in response to
the communication server receiving a connection
request from the agent,
downloading instructions configured to download program
instructions to the user interface from the web server,
wherein
the program instructions are configured to allow the
display of a toolbar on the user interface,
pushing instructions configured to cause the communication server to asynchronously push information to the
user interface via the persistent connection, wherein
the information indicates that the first connection has
switched from the first state to the second state, and
causing instructions configured to cause the user interface
to be asynchronously updated, wherein
the causing the user interface to be asynchronously
updated indicates that the first connection has
switched from the first state to the second state, and the causing the user interface to be asynchronously updated is performed in response to the determining, if the first connection has switched from the first state to the second state.

34. The computer system of claim 33, wherein
the first state is one of active and inactive,
the second state is active when the first state is inactive, and
the second state is inactive when the first state is active.

35. The computer system of claim 33, wherein the instructions further comprise:
second causing instructions configured to cause the user interface to indicate that the first connection is inactive when the second state is inactive.

36. The computer system of claim 33, wherein the instructions further comprise:
allowing instructions configured to allow initiation of communication via the first connection when the second state is inactive.

37. The computer system of claim 33, wherein the instructions further comprise:
second causing instructions configured to cause the user interface to indicate that the first connection is active when the second state is active.

38. The computer system of claim 33, wherein the instructions further comprise:
disallowing instructions configured to disallow initiation of communication via the first connection when the second state is active.

* * * * *

UNITED STATES PATENT AND TRADEMARK OFFICE
CERTIFICATE OF CORRECTION

PATENT NO. : 8,839,270 B2  
APPLICATION NO. : 10/457905  
DATED : September 16, 2014  
INVENTOR(S) : Chen et al.

Page 1 of 2

It is certified that error appears in the above-identified patent and that said Letters Patent is hereby corrected as shown below:

On Title page, column 1, under Inventors, line 1, delete "Mingtse" and insert -- Mingte --, therefor.

On Title page 2, column 2, under U.S. Patent Documents, line 8, delete "Stent et al." and insert -- Strandberg et al. --, therefor.

In the Drawings

On sheet 18 of 31, in figure 2k, line 1, delete "TELSET" and insert -- TELESET --, therefor.

On sheet 18 of 31, in figure 2k, line 3, delete "TELSET" and insert -- TELESET --, therefor.

In the Specification

In column 1, line 38, delete "on same" and insert -- on --, therefor.

In column 4, line 32, delete "support-requests" and insert -- support requests --, therefor.

In column 8, line 35, delete ""11234", ".}" and insert -- "1234", " "} --, therefor.

In column 13, line 52, delete "requests," and insert -- requests --, therefor.

In column 14, line 55, delete "server 10" and insert -- server 110 --, therefor.

In column 27, line 10, delete "server 1101" and insert -- server 110 --, therefor.

Signed and Sealed this  
Seventeenth Day of March, 2015

Michelle K. Lee  
*Director of the United States Patent and Trademark Office*

CERTIFICATE OF CORRECTION (continued)
U.S. Pat. No. 8,839,270 B2

In column 27, line 60, delete "server 10" and insert -- server 110 --, therefor.

In column 30, line 9, delete "read" and insert -- ready --, therefor.